United States Patent [19]

Takahara et al.

[11] Patent Number: 5,436,635
[45] Date of Patent: Jul. 25, 1995

[54] DISPLAY DEVICE AND DISPLAY SYSTEM USING THE SAME

[75] Inventors: Hiroshi Takahara, Neyagawa; Hideki Ohmae, Suita, both of Japan

[73] Assignee: Matsushita Electric Industrial Co., Ltd., Osaka, Japan

[21] Appl. No.: 27

[22] Filed: Jan. 4, 1993

[30] Foreign Application Priority Data

Jan. 8, 1992 [JP] Japan .................. 4-001249

[51] Int. Cl.6 ............................ G09G 3/36
[52] U.S. Cl. ........................ 345/92; 345/90; 345/96; 345/98
[58] Field of Search .......... 340/784, 719; 359/51, 359/52, 41, 87; 345/96, 98, 90, 92; 358/60, 236

[56] References Cited

U.S. PATENT DOCUMENTS

| 4,613,207 | 9/1986 | Fergason . | |
|---|---|---|---|
| 4,936,656 | 6/1990 | Yamashita et al. | 345/92 |
| 4,977,456 | 12/1990 | Furuya . | |
| 5,117,298 | 5/1992 | Hirai | 345/96 |

FOREIGN PATENT DOCUMENTS

| 62-111233 | 5/1987 | Japan . |
|---|---|---|
| 63-183484 | 7/1988 | Japan . |
| 2-244089 | 9/1990 | Japan . |
| 3-98022 | 4/1991 | Japan . |

Primary Examiner—Alvin E. Oberley
Assistant Examiner—Vivian W. Chang
Attorney, Agent, or Firm—Wenderoth, Lind & Ponack

[57] ABSTRACT

Pixel electrodes and thin film transistors are arranged in a matrix in a display device, while polymer dispersion liquid crystals are interposed between an opposite electrode and the pixel electrodes on an electrode substrate. A signal is written into each pixel electrode by a pair of drive ICs for outputting signals in positive and negative polarities respectively with respect to an electrical potential at the opposite electrode. Two transistors are provided at each pixel electrode or an analog switch is provided at a signal output terminal of each drive IC so that signals of positive and negative polarities are not simultaneously written into an identical pixel electrode. When no voltage is applied to the pixel electrode, the incident light is reflected so as to be dispersed by the liquid crystal, and when a voltage is applied to the pixel electrode, the state of the liquid crystal is made light-permeable. The display device is used as a display panel to construct a viewfinder having a low electrical power consumption. The display device is also used as a light valve to construct a projection type television capable of displaying a magnified video picture on a screen with a high luminance.

29 Claims, 26 Drawing Sheets (b) "OFF"

(b) "ON"

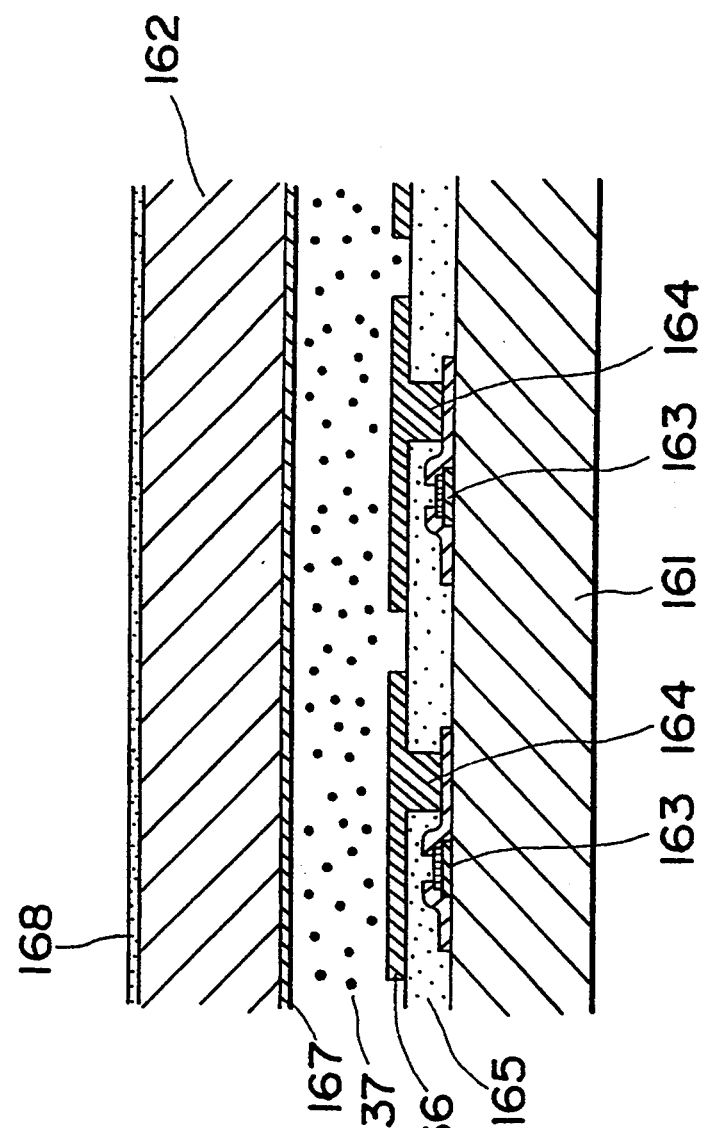
Fig. 18A
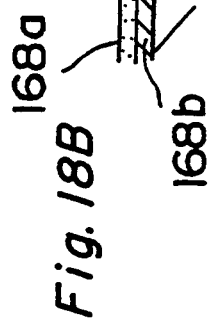

DISPLAY DEVICE AND DISPLAY SYSTEM USING THE SAME

BACKGROUND OF THE INVENTION

Field of the Invention

The present invention relates to a display device for forming an optical image thereon by modulating an incident light ray, and in particular to a display system for magnifying and projecting the image formed on the display device (this display system referred to as "LCD image projection type television system" hereinafter), and a display system for displaying a video image in recording by means of a video camera or the like (this display system referred to as "view finder" hereinafter).

Description of the Prior Art

A display device employing a liquid crystal display panel (referred to as an "LCD panel" hereinafter) has been enthusiastically studied and developed because of its capability for light weight and thin configuration designing. In recent years, pocket television sets employing a twisted nematic (TN) mode LCD panel utilizing rotatory polarization property of the LCD panel for image display has been put into practical use. Furthermore, LCD image projection type television systems, view finders, and the like using the above-mentioned LCD panel as a display device have been also put in practical use.

FIG. 23 is a diagram showing an equivalent circuit of a conventional display device employing an active matrix type LCD panel. Referring to FIG. 23, reference characters $G_1$ through $G_m$ denote gate signal lines each having its one end connected to a gate drive IC 231. The gate drive IC 231 outputs a voltage for turning on (this voltage referred to as "on-voltage" hereinafter) a thin film transistor. (referred to as "TFT" hereinafter) serving as a switching element or a voltage for turning off (this voltage referred to as "off-voltage" hereinafter) the TFT. Meanwhile, reference characters $S_1$ through $S_n$ denote source signal lines each having its one end connected to a source drive IC 232.

The TFT is each represented by $T_{ij}$ (i: an integer belonging to a row of the matrix, j: an integer belonging to a column of the matrix) which is connected to a pixel electrode $P_{ij}$. TN liquid crystals (not shown) are interposed between the pixel electrode $P_{ij}$ and an opposite electrode (not shown). The TN liquid crystals change their orientation conditions according to a voltage input to the pixel electrode thereby to modulate incident light.

The following describes a drive circuit for the conventional display device. FIG. 25 shows a block diagram of a drive circuit for the conventional display device.

Referring to FIG. 25, reference numeral 251 denotes an amplifier for amplifying a video signal to a specified value, while reference numeral 252 denotes a phase division circuit for generating a video signal of positive polarity and negative polarity. It is herein noted that the positive polarity means an electric potential higher than the electric potential at the opposite electrode (referred to as the "common voltage" hereinafter) while the negative polarity means an electric potential lower than the electric potential at the opposite electrode. Reference numeral 253 denotes an output changeover circuit for outputting an AC video signal which is inverted in polarity every one field (1F) or every one horizontal scanning line (1H). Reference numeral 254 denotes an LCD panel, and reference numeral 255 denotes a drive IC control circuit for effecting synchronization and control of the source drive IC 232 and the gate drive IC 231.

The following describes the operations of the drive circuit shown in FIG. 25 of the conventional display device. First in the amplifier 251, a gain adjustment is effected so that the amplitude of a video signal corresponds to the electric and optical characteristics of the liquid crystals. Then the video signal which has undergone the gain adjustment is input to the phase division circuit 252 to yield two output video signals, one in positive polarity and the other in negative polarity with respect to the common voltage of the opposite electrode. The video signals of positive and negative polarities are input to the output changeover circuit 253, and the output changeover circuit 253 outputs a video signal which is inverted in polarity every one field (1F) or every one horizontal scanning cycle (1H). The reason why the video signal is inverted in polarity is to apply an AC voltage to the liquid crystals because the liquid crystals are decomposed to be deteriorated when receiving a DC voltage. Then a video signal from the output changeover circuit 253 is input to the source drive IC 232, and the source drive IC 232 applies a sampled video signal to the source signal line of the LCD panel 254 in synchronization with the gate drive IC 231 according to a control signal transmitted from the drive IC control circuit 255.

FIG. 26 is a graph showing a relation between an application voltage V applied to liquid crystals and a light transmission quantity T. It is noted here that the application voltage to the liquid crystals is an AC voltage. Therefore, the application voltage V shown in the graph of FIG. 26 represents the effective value of the AC application voltage V. The light transmission quantity T varies when the application voltage V to the liquid crystals is not lower than $V_r$, while the light transmission quantity T saturates when the application voltage is at a voltage Vm. Normally, the critical voltage $V_r$ is 1.5 to 1.8 V, while the saturation voltage Vm is about 5.0 to 6.0 V when TN liquid crystals are used.

The following describes the operations of the conventional display device with reference to FIG. 23. For simplifying the description, it is assumed that an output voltage of $V_+$ or $V_-$ is output from the source drive IC 232 to all the source signal lines $S_j$ (j: 1, ..., n). Basically in the present specification, superimposition of an additional signal + onto the signal voltage V means a signal of a positive polarity with respect to the common voltage, while superimposition of an additional signal—onto the signal voltage V means a signal of a negative polarity with respect to the common voltage. It is further noted that an arbitrary pixel row of a matrix is indicated with a supplementary character i (i: 1, ..., m) attached, and an arbitrary pixel column of the matrix is indicated with a supplementary character j attached.

First, an on-voltage is applied to a gate signal line $G_1$ from the gate drive IC 231, and an off-voltage is applied to the other gate signal lines $G_2$ through $G_m$. In the above case, each $T_{1j}$ of the TFTs on the first row is turned on so that the signal $V_+$ output on a source signal line $S_j$ applied from the source drive IC 232 is input to each pixel electrode $P_{1j}$ arranged on the first row. The liquid crystals on the pixel electrode $P_{1j}$ changes their orientation conditions to modulate incident light due to the input voltage signal $V_+$.

Next, the gate drive IC 231 applies an on-voltage to a second gate signal line $G_2$, while an off-voltage is applied to the other gate signal lines. Then, each TFT $T_{2j}$ on the second row is turned on so that the signal $V_-$ output on the source signal line $S_j$ is applied from the source drive IC 232 to a pixel electrode $P_{2j}$ arranged on the second row. In a manner as described above, the gate drive IC 231 sequentially writes the voltages into the pixel electrodes $P_{ij}$ shifting the on-voltage output position from $G_1$ to $G_m$. It is noted here that a time necessary for scanning one gate signal line is referred to as the "1H cycle", and a cycle from the time when a voltage is applied to a pixel electrode to the time when the voltage is subsequently applied to the same pixel electrode is referred to as the "one field cycle" (1F in short) hereinafter. Normally, 1F is 1/60 second. It is further noted that two fields forms one frame, and one frame forms one screen in the television signal.

FIG. 24 shows an output waveform 241 of the voltage signal that is applied from the source drive IC 232 to the source signal lines $S_j$. The polarity of the output signal is altered every horizontal scanning cycle 1H. The above-mentioned method of driving the display device with the output signal from the source drive IC 232, where the polarity of the voltage signal is altered every 1H cycle is referred to as the "1H inversion drive" hereinafter. When a signal as shown in FIG. 24 is applied to the display device, a horizontal stripe-shaped image is displayed on the LCD panel.

A positive voltage V (P) and a negative voltage V (M) are supplied to the source drive IC 232, and a signal having a voltage ranging from $+V_m$ to $-V_m$ is output within the aforementioned voltage range to drive the LCD panel. It is noted that the central value $V_0$ of the signal applied to each pixel shown in FIG. 24 preferably coincides with the common voltage. However, the central value $V_0$ is usually shifted negative in polarity with respect to the common voltage due to a parasitic capacitance between the TFT array gate signal lines and the pixel electrodes, electromagnetic field exerted from the gate signal lines to the opposite electrode, and the like. It is noted here that the central value $V_0$ of the signal has the same potential as the common voltage, and inputting of the voltage $V_0$ to each pixel electrode means that the same voltage as the common voltage is input to each electrode for the purpose to provide a simplified description. In the case of inputting the common voltage value $V_0$, no voltage is applied to the liquid crystals on the pixel electrode $P_{ij}$, which causes no change in the orientation of the liquid crystals.

An exemplified LCD image projection type television system using such a conventional display device as a light valve is disclosed, for example, in the Japanese Patent Laid-Open Unexamined Publication No. HEI 2-244089 The above-mentioned example uses as a light valve a display device utilizing the aforementioned twisted nematic (TN) liquid crystals, where a metal halide lamp or a halogen lamp is used as a light source.

The LCD image projection type television system has a following construction. Light emitted from a lamp is separated into three primary color light paths of red, blue, and green (referred to as the "R light component", "B light component", and "G light component" respectively hereinafter) by means of dichroic mirrors. The three primary color light components respectively irradiate three transmission type display devices. The display devices are provided for respectively receiving the R light, B light, and G light components to vary the transmittance of the light according to a video signal to thereby modulate each of the color light components in intensity. The modulated light components are synthesized into an image by a dichroic mirror or mirrors provided on the output side of the display devices so as to be projected on a screen by means of a projection lens.

An exemplified conventional view finder is disclosed, for example, in the Japanese Patent Laid-Open Unexamined Publication No. SHO 62-111233. It is noted here that the term "view finder" is defined to be an object integrating at least a light source such as a light emitting element with a display device.

A rod-shaped fluorescent tube has been conventionally used as a light emitting means. The fluorescent tube has a diameter of 2 to 5 mm when a small size twisted nematic (TN) liquid crystal panel having a display area of about 1 inch is used as a display device. When the TN liquid crystal panel has a display area greater than 1 inch, several fluorescent tubes are used in many cases. Each fluorescent tube emits light forward and backward. In order to utilize the light emitted backward, a concave reflection plate is provided behind the fluorescent tube. The light emitted backward from the fluorescent tube is reflected forward on the reflection plate. A diffusion plate is provided between the fluorescent tube and the TN LCD panel. The diffusion plate is used to diffuse the light from the fluorescent tube to form a surface light source. Light from the surface light source formed by the diffusion plate is incident on the TN LCD panel. The surface light source has an area equal to or greater than the image display region of the TN LCD panel. Polarizing plates are provided before and behind the TN LCD panel. The polarizing plate interposed between the diffusion plate and the TN LCD panel (the polarizing plate referred to as the "polarizer" hereinafter) has a function of converting the light from the surface light source into a linearly polarized light. The analyzer plate interposed between the TN liquid crystal panel and an observer of the display screen (referred to as "analyzer" hereinafter) has a function of interrupting the light according to the degree of modulation of the light incident on the TN LCD panel. Normally, the polarizer and the analyzer are arranged so that the polarization directions of the two cross each other at right angles.

The surface light source is formed as described above, and the light from the surface light source is converted into a linearly polarized light by the polarizer. The TN LCD panel modulates the linearly polarized light according to an applied video signal. The analyzer shields the light or allow the light to be transmitted according to the degree of modulation. Thus, a display image is formed. The display image can be viewed through magnification by a magnifying lens arranged between the analyzer and the observer.

As apparent from the above description, it is necessary to use linearly polarized light in a display device employing a conventional TN LCD panel. Therefore, totally two polarizing plates are required to be arranged on the light input side and light output side of the LCD panel. Since the polarizing plates absorb not less than half of light, which results in a problem that only a low-luminance display image can be obtained.

For the same reasons, no high-luminance image display can be performed even when constructing an LCD image projection type television system by using the conventional display device. Furthermore, the polarizing plates absorb light to generate heat, and the generated heat is conducted to the LCD panel to consequently deteriorate the panel. The polarizing plates themselves deteriorate due to light absorption to result in worsening the degree of polarization.

Any video camera is required to be compact and light in weight in terms of its portability and operability. Therefore, currently there is a growing trend of introducing a liquid crystal panel as a display system for a view finder. However, any view finder employing an LCD panel consumes fairly much power in the current situation. For instance, the power consumption a view finder employing an LCD panel amounts up to 1.1 W including the LCD panel power consumption of about 0.1 W and the light source power consumption of about 1.0 W. Any video camera has a limited battery capacity to assure its compactness and light weight. When a great power is consumed by the view finder, there is a serious problem that only a short continuous operation time is permitted.

The reason why the view finder consumes much power is that the polarizing plate to be used for the TN LCD panel has a total transmittance of only about 30% assuring a low utilization efficiency of light. In addition, a light box comprised of the fluorescent tube and the reflection plate is required to form a surface light source having less unevenness in luminance. Therefore, a diffusion plate is provided between the TN LCD panel and the fluorescent tube. When a diffusion plate having a low light diffusion capability is used, a lighting pattern of the fluorescent tubes appears to be visible through the display screen to consequently degrade the display image quality. Therefore, a diffusion plate having a high light diffusion capability is used. However, when the degree of light diffusion is increased, generally the light transmittance of the diffusion plate is reduced. Therefore, it is the last resort to increase the output quantity of light from the light source in order to obtain necessary luminance, which also results in increasing the power consumption of the light source.

Furthermore, in the conventional display device, one drive circuit has been outputting a signal in positive polarity and a signal in negative polarity. When a greater number of pixels are included in the display device, a higher operation frequency of the drive circuit is required. It is noted that the drive circuit mentioned herein means a drive IC for outputting a signal to each signal line of the display device. When the operation frequency is made higher, the output signal cannot be increased in amplitude. According to the existing techniques, when the operation frequency is about 20 MHz, it is permissible to achieve a signal amplitude of about ±6 V or smaller, meaning that a signal amplitude up to a voltage slightly lower than 12 V can be achieved in design. It is difficult to design a drive circuit IC capable of yielding a voltage higher than the above-mentioned voltage in regard to its endurance voltage and heat resistance. The scheme of increasing the signal amplitude also results in increasing the heat generation of the IC to consequently cause a faulty operation or the damage of the IC. The scheme of increasing the operation frequency also causes heat generation. Increasing the signal amplitude requires increase of the scale of an output buffer element of the IC, which also results in dimensional increase of the IC and cost increase. Furthermore, introduction of a special process for producing such an IC is required.

In order to decrease the operation frequency of the drive circuit, there is a method of dividing the display region into several segment regions, providing a drive circuit for each segment region, and making them operate in parallel. However, the above-mentioned method has the drawback of a difference in level between the signals input to the segment regions to disadvantageously result in the presence of junctures between the segment regions. There is currently a trend for increasing the pixels in amount in excess of one million pixels to add more difficulties to designing and developing an IC for the drive circuit in terms of its endurance voltage and heat resistance.

The display device employing the polymer dispersion liquid crystals requires no polarizing plate. Therefore, a high luminance display can be achieved, however, it has a drawback of low contrast. In order to increase the contrast, it is necessary to improve the light diffusion capability in a condition where no voltage is applied. In order to improve the light diffusion capability, it is required to increase the liquid crystal film thickness. However, when the liquid crystal film thickness is increased, the voltage for making the liquid crystals transmissive is higher.

SUMMARY OF THE INVENTION

Accordingly, an essential object of the present invention is to provide a display device capable of achieving a high-luminance and high-contrast image display, an LCD image projection type television system using the display device as a light valve, and a view finder using the display device as an image display unit.

A first display device of the present invention comprises a first drive circuit for outputting a signal of positive polarity with respect to a common voltage applied to an opposite electrode, a second drive circuit for outputting a signal of negative polarity with respect to the common voltage, and a substrate on which are formed pixel electrodes arranged in matrix and at least first and second switching elements for inputting a signal to the pixel electrodes. One terminal of the first switching element and a signal output terminal of the first drive circuit are connected to a first signal line to be capable of inputting the signal of positive polarity to the pixel electrodes. On the other hand, one terminal of the second switching element and a signal output terminal of a second drive circuit are connected to a second signal line to be capable of inputting the signal of negative polarity to the pixel electrodes. The first and second switching elements are controlled so as not to be simultaneously turned on.

A second display device of the present invention comprises: a first drive circuit for outputting a signal of positive polarity with respect to a common voltage applied to an opposite electrode, a second drive circuit for outputting a signal of negative polarity with respect to the common voltage, a substrate on which are formed pixel electrodes arranged in matrix and a switching element for inputting a signal to the pixel electrodes, and first and second changeover circuits for changing over in two modes between a conductive condition and a low-impedance or high-impedance cut-off condition. The switching element is preferably a transistor element. One terminal of the switching element is connected to a signal line. One end of the signal line is connected to the first drive circuit via the first changeover circuit, while the other end of the signal line is connected to the second drive circuit via the second changeover circuit. The first changeover circuit and the second changeover circuit are controlled so that they are not made simultaneously conductive. In other words, the first and second changeover circuits are controlled so that the signal of positive polarity output from the first drive circuit and the signal of negative polarity output from the second drive circuit are not simultaneously applied to the signal line. A switching circuit inputs the signal of positive polarity or the signal of negative polarity to each pixel electrode in synchronization with the signal output timing of each drive circuit.

Polymer dispersion liquid crystals are used for the display device of the present invention. The polymer dispersion liquid crystals necessitate no polarizing plate in modulating light. Therefore, an image display two times higher or more in luminance than that of a display device employing conventional TN LCD can be achieved.

A display device of the present invention employs a drive circuit for outputting a positive signal and a drive circuit for outputting a negative signal. Therefore, the outputs of the two drive circuits can be combined to thereby achieve a signal amplitude doubled even though the signal output from each drive circuit is comparatively small in amplitude. For instance, when each of the drive circuits for outputting the signal in positive polarity and the signal in negative polarity outputs a signal having an amplitude of 10 V, a voltage of $10+10=20$ (V) can be applied to each pixel electrode.

By using the drive circuit for the positive polarity and the drive circuit for the negative polarity, a sufficient high voltage can be applied to each pixel electrode of the display device. Therefore, a high-contrast high-luminance image display can be achieved by using the polymer dispersion liquid crystals. Each one of the drive circuits is only required to yield a signal amplitude smaller than that of the conventional drive circuit, and therefore it can sufficiently cope with a higher frequency.

An LCD image projection type television system of the present invention includes a light source such as a metal halide lamp, a color separation optical system for separating light from the light source into R, B, and G light components, and display devices of the present invention arranged in the light paths of the R, B, and G light components. Light modulated by the display devices is magnifyingly projected on a screen to achieve an enlarged color image display.

The opposite electrode of the display device of the present invention has a reflection prevention construction to prevent unnecessary reflection. The pixel electrodes may be constructed by reflection type electrodes. By selecting reflection type pixel electrodes, the pixel numerical aperture can be improved to allow a higher luminance image display to be achieved.

The LCD image projection type television system of the present invention can achieve a high-luminance high-contrast image display by using the display device of the present invention as a light valve.

A view finder of the present invention is as follows. Light emitted at a wide solid angle from a small light emitting region of a light emitting element is converged into a light ray nearly equal to a parallel light ray having a narrow directivity by a convergence lens. The light is incident on the display device of the present invention serving as the light modulation means. The display device modulates the incident light according to a video signal to display a display image. The display image can be viewed through magnification by means of a magnifying lens interposed between the eyes of an observer and the display device.

Since the view finder of the present invention permits a small light source, a power consumption smaller than that of a light box employing a conventional fluorescent tube can be assured. Furthermore, the entire body of the view finder can be compacted. Use of the polymer dispersion liquid crystals obviates the need of polarizing plates while achieving a high use efficiency of light to permit a reduced power consumption.

An electroluminescent tube, a fluorescent electroluminescent element, or an LED (light Emitting Diode) may be used as the light emitting element of the view finder of the present invention. A small light emitting region is achieved by means of a light shielding plate, or the like.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 18A–18C are sectional views of a display device; in accordance with another embodiment of the present invention;

DETAILED DESCRIPTION OF THE PREFERRED EMBODIMENTS

The following describes a display device of the present invention with reference to the attached drawings.

Figure 13:
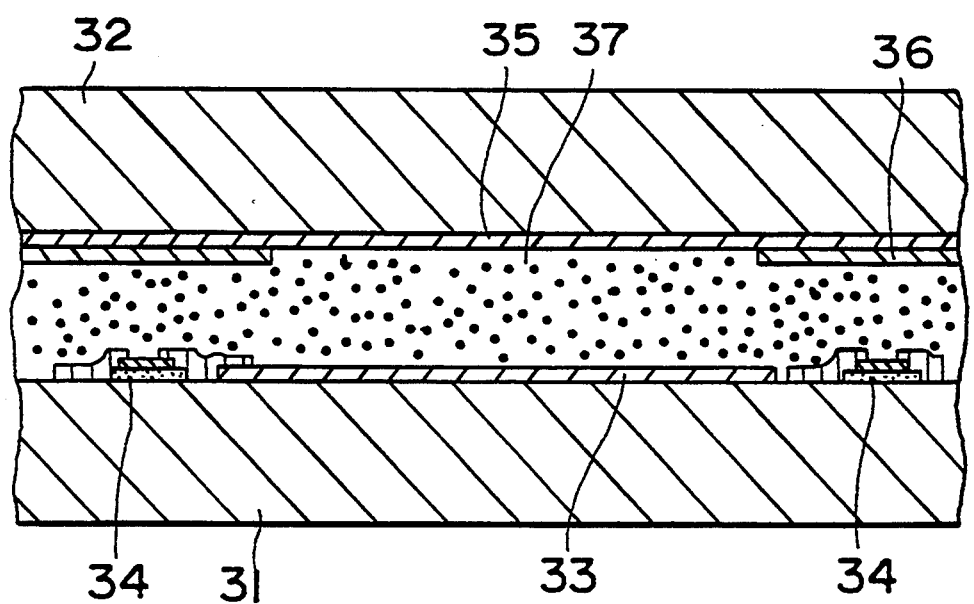
FIG. 13 is a sectional view of a display device according to the present invention.

FIG. 13 shows a sectional view of a display device of the present invention. Referring to FIG. 13, reference numeral 31 denotes an array substrate on which a pixel electrode 33 composed of an ITO, a TFT 34, and other parts are formed. Reference numeral 32 denotes an opposite electrode substrate of which lower surface is provided with an opposite electrode 35. Between the opposite electrode 35 and the pixel electrode 33 are interposed polymer dispersion liquid crystals (referred to as "polymer dispersion LC" hereinafter) 37. Reference numeral 36 denotes a black matrix for preventing light from being irradiated against the TFT 34, where the black matrix 36 is made of a metal thin film of chromium or the like material. It is noted here that a display panel such as an LCD panel having a drive circuit such as a drive IC connected thereto is referred to as a "display device" or "LCD device" hereinafter.

The following provides a brief description for the polymer dispersion liquid crystals (polymer dispersion LC) 37. The polymer dispersion LC is classified largely into two types according to the dispersion condition of the liquid crystals and polymers. One type of the polymer dispersion LC is in such a condition that waterdrop-shaped liquid crystals are dispersed in polymers. In this case, the liquid crystals exist in the polymers in an discontinuous condition. The above-mentioned type of liquid crystals is referred to as the "PDLC", and an LCD panel employing a PDLC is referred to as the "PDLCD panel" hereinafter. The other is such a type that a network of polymers extends in the liquid crystal layer, which corresponds to a construction where liquid crystals are impregnated into a sponge. The liquid crystals exist continuously but not in waterdrop forms. This type of liquid crystals is referred to as "PNLC" hereinafter. Display of an image on each of the above-mentioned two types of liquid crystal panels PDLC and PNLC can be performed by controlling diffusion and transmission of light.

The PDLC takes advantage of its property that the refractive index of the liquid crystals differs depending on the orientation direction of the liquid crystals. Without application of voltage to the liquid crystals, the waterdrop-shaped liquid crystals are oriented in irregular directions. In this condition, a difference in refractive index takes place between the polymers and the liquid crystals to result in diffusion of incident light. With application of a voltage to the liquid crystals, the orientation directions of the liquid crystals are aligned in a direction. By preliminarily making the refractive index of the liquid crystals oriented in a direction coincide with the refractive index of the polymers, the incident light is not diffused but transmitted through the liquid crystals.

In contrast, the PNLC takes advantage of its property of the irregularity in orientation of the liquid crystal molecules. In the irregular orientation condition, i.e., without application of voltage to the liquid crystals, incident light is diffused, while when the orientation condition is regularized with a voltage applied to the liquid crystals, the light is transmitted.

It is noted that the above description of the operations of the PDLC and PNLC are simplified sample models. Although either of the PDLCD panel or the PNLCD panel can be limitlessly used as a panel for the display device of the present invention, for simplicity of description, the PD liquid crystal panel is taken as an example in the following description. It is noted here that the PDLC and PNLC are generically referred to as the "polymer dispersion liquid crystals (polymer dispersion LC)", and PDLCD panel and the PNLCD panel are generically referred to as "polymer dispersion LCD panel" hereinafter, and that resin components in the liquid crystal layer is referred to as "polymers" hereinafter.

Figure 14A:
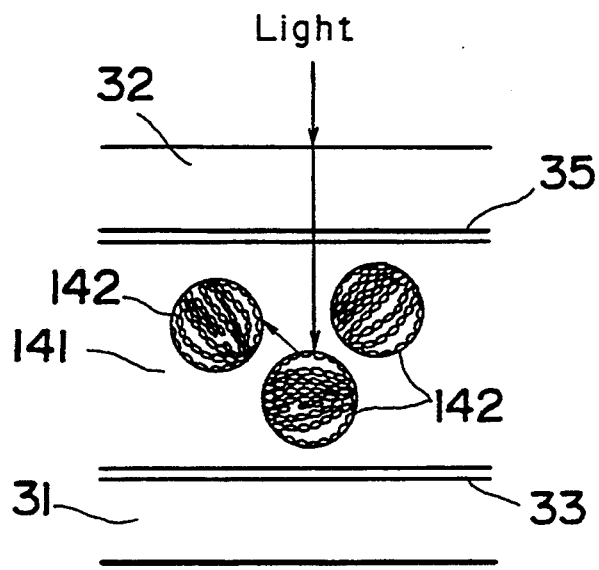
FIGS. 14 (a) and 14 (b) are views for explaining the operation of a polymer dispersion LCD panel.
Figure 14B:
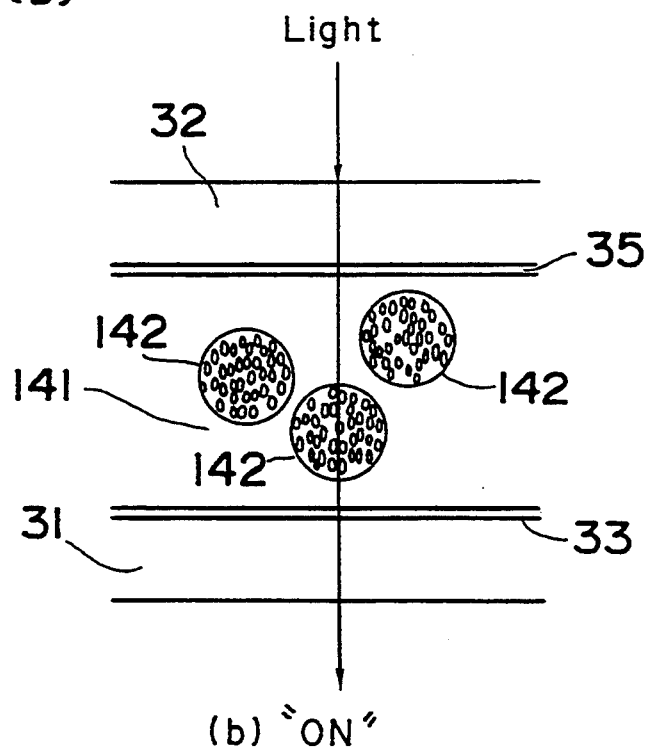

A brief reference is made for the operation of the polymer dispersion LCD panel with reference to FIGS. 14 (a) and 14 (b).

Referring to FIGS. 14 (a) and 14 (b), reference numeral 142 denotes waterdrop-shaped liquid crystals, while reference numeral 141 denotes polymers. A TFT (not shown) and other parts are connected to the pixel electrode 33 on the array substrate 31, and the TFT is turned on and off to apply a voltage to the pixel electrode 33. With application of a voltage, the orientation directions of the waterdrop-shaped liquid crystals 142 dispersed in the polymers 141 are varied between the pixel electrode 33 and the opposite electrode 35 thereby to modulate incident light.

In the condition where no voltage is applied (off condition) as shown in FIG. 14 (a), the waterdrop-shaped liquid crystals are oriented in different directions. In this case, a difference in refractive index exists between the polymers 141 and the liquid crystals 142 to diffuse the incident light. When a voltage is applied to the pixel electrode 33 as shown in FIG. 14 (b), the orientations of the liquid crystals are aligned in a direction. By preliminarily making the refractive index of the liquid crystals 142 oriented in a direction coincide with the refractive index of the polymers 141, the incident light is not diffused but transmitted outward through the array substrate 31. It is noted here that a common voltage is applied to the opposite electrode 35.

Preferred materials for the liquid crystal panel of the present invention include nematic liquid crystals, smectic liquid crystals, and cholesteric liquid crystals. The preferred material may be a liquid crystal compound including one or not less than two liquid crystal types or a mixture of such a compound and a substance other than the compound. Among the above-mentioned liquid crystal materials, cyanobiphenyl group nematic liquid crystals or fluorine group nematic liquid crystals are preferred. Among others, the fluorine group nematic liquid crystals are stable by virtue of their less decomposition capability due to light. With the above-mentioned material, an advantageous liquid crystal layer capable of having an electric charge retention of not less than 90% and a good heat resistivity can be produced. Transparent polymers are preferred as the resin material, and any of thermoplastic resin, thermosetting resin, and photo-hardening resin may be selected. An ultraviolet-hardening type resin is preferred because it can be easily produced and well separated from the liquid crystals. As a concrete example, an ultraviolet-hardening type acrylic resin can be enumerated. Particularly preferred is resin containing acrylic monomer or acrylic oligomer which is polymerized and hardened by being subjected to ultraviolet ray irradiation. In such resin, only the resin component reacts to polymerize into polymers by being subjected to ultraviolet ray irradiation, and only the liquid crystals are separated in phase.

As the above-mentioned type of polymer forming monomer, there can be enumerated, for example, 2-ethylhexyl acrylate, 2-hydroxyethyl acrylate, neopentyl glycol diacrylate, hexanediol diacrylate, diethylene glycol diacrylate, tripropylene glycol diacrylate, polyethylene glycol diacrylate, trimethylol propane triacrylate, pentaerythritol acrylate, and the like.

As oligomer or prepolymer, there can be enumerated polyester acrylate, epoxy acrylate, polyurethane acrylate, and the like.

In order to quickly perform polymerization, a polymerization initiator may be used. As the polymerization initiator, there can be enumerated 2-hydroxy-2-methyl-1-phenylpropane-1-on ("Dalocure 1173" available from Merk & Corp. Inc.), 1-(4-isopropylphenyl)-2-hydroxy-2-methylpropane-1-on ("Dalocure 1116" available from Merk & Corp. Inc.), 1-hydroxy cyclohexyl phenylketone ("Irgacure 651" available from Ciba-Geigy AG), and the like. Furthermore, a chain transfer agent, photosensitizer, dye, crosslinking agent, or the like may be appropriately incorporated as an additional ingredient.

In the above case, independent particle-like waterdrop-shaped liquid crystals are formed when a small amount of the liquid crystals is incorporated with respect to the polymer resin component. When a large amount of liquid crystals are incorporated, a resin matrix exists in a particle-like or network form in the liquid crystal material, where the liquid crystals are formed in a form of a continuous layer. In the above case, good incident light diffusion capability is not assured to fail in increasing the contrast unless the particle diameter of the waterdrop-shaped liquid crystals or the pore diameter of the polymer network is fairly uniform within the range of 0.5 $\mu$m to several micrometers. It is preferred that the average particle size of the waterdrop-shaped liquid crystals or the average pore diameter of the polymer network is in the range of 0.8 $\mu$m to 3.0 $\mu$m. In order to achieve the above-mentioned dimensional condition, the material for use must be a material such as the ultraviolet-hardening resin which can be hardened in a short time. The compounding ratio between the liquid crystal material and the polymer material is preferably in the range of 90:10 to 30:70, and more preferably in the range of 50:50 to 90:10. The liquid crystal thin film 37 preferably has a thickness in a range of 10 $\mu$m to 30 $\mu$m, and more preferably 12 $\mu$m to 20 $\mu$m, where the thickness of the liquid crystal thin film 37 is to be determined in relation to a drive voltage therefor. When the film thickness is not greater than 20 $\mu$m, there can be achieved a condition for satisfactorily diffusing incident light (the condition referred to as the "complete diffusion condition" hereinafter) to enable the obtainment of a high contrast. However, a drive voltage not lower than 10 V is required. The drive voltage greatly depends on the compounding ratio, materials for practical use, and the like. The drive voltage for achieving a light transmittance of 90% was about 7 V when fluorine group liquid crystals are used, while the compounding ratio between the liquid crystals and the polymers is 80:20, with the liquid crystal film thickness of 15 $\mu$m.

As apparent from the above description, in the polymer dispersion LCD panel, an image is displayed by controlling the diffusion and transmission of incident light. In order to obtain a display image with a high-contrast, it is necessary to reduce the light transmission quantity as far as possible when the light is diffused (referred to as the "diffused light transmission quantity" hereinafter), idealistically, the complete diffusion condition is required. The complete diffusion condition means a display panel condition where a uniform luminance is assured everywhere the panel is viewed in any direction. In order to reduce the diffused light transmission quantity, the thickness of the liquid crystal film is required to be increased.

Figure 24:
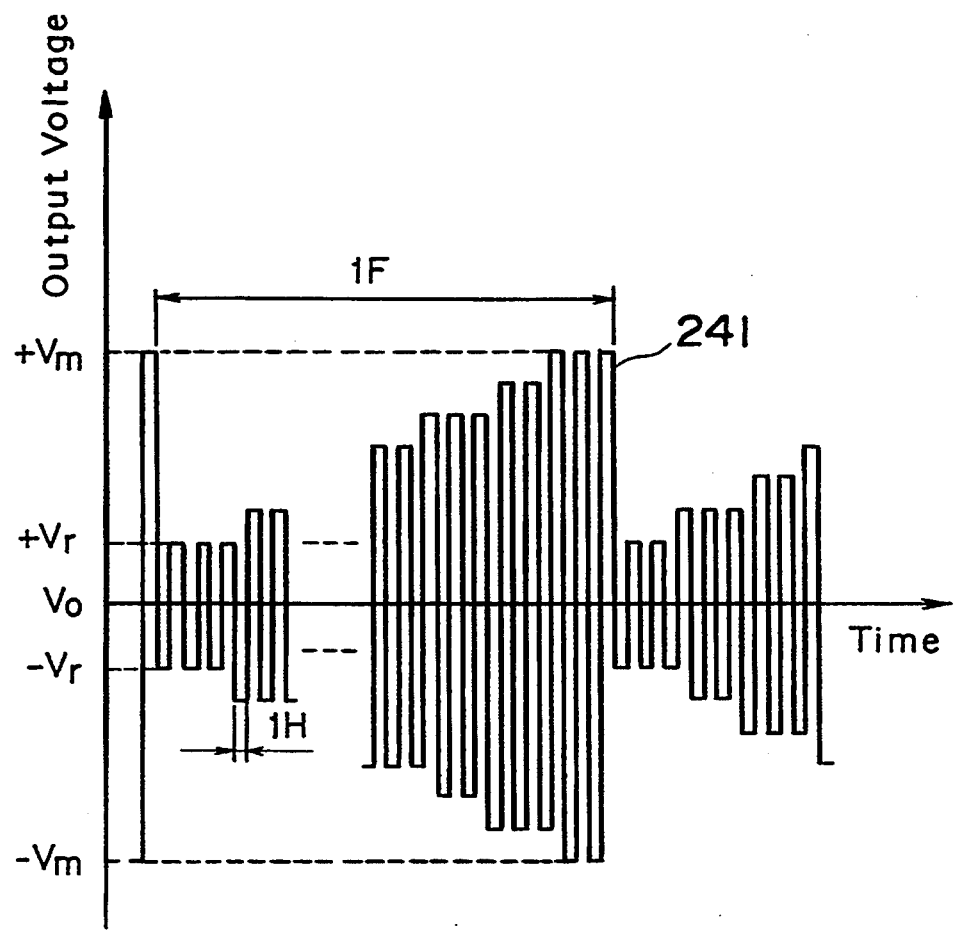
FIG. 24 is an output waveform of a source drive IC of a conventional display device.
Figure 25:
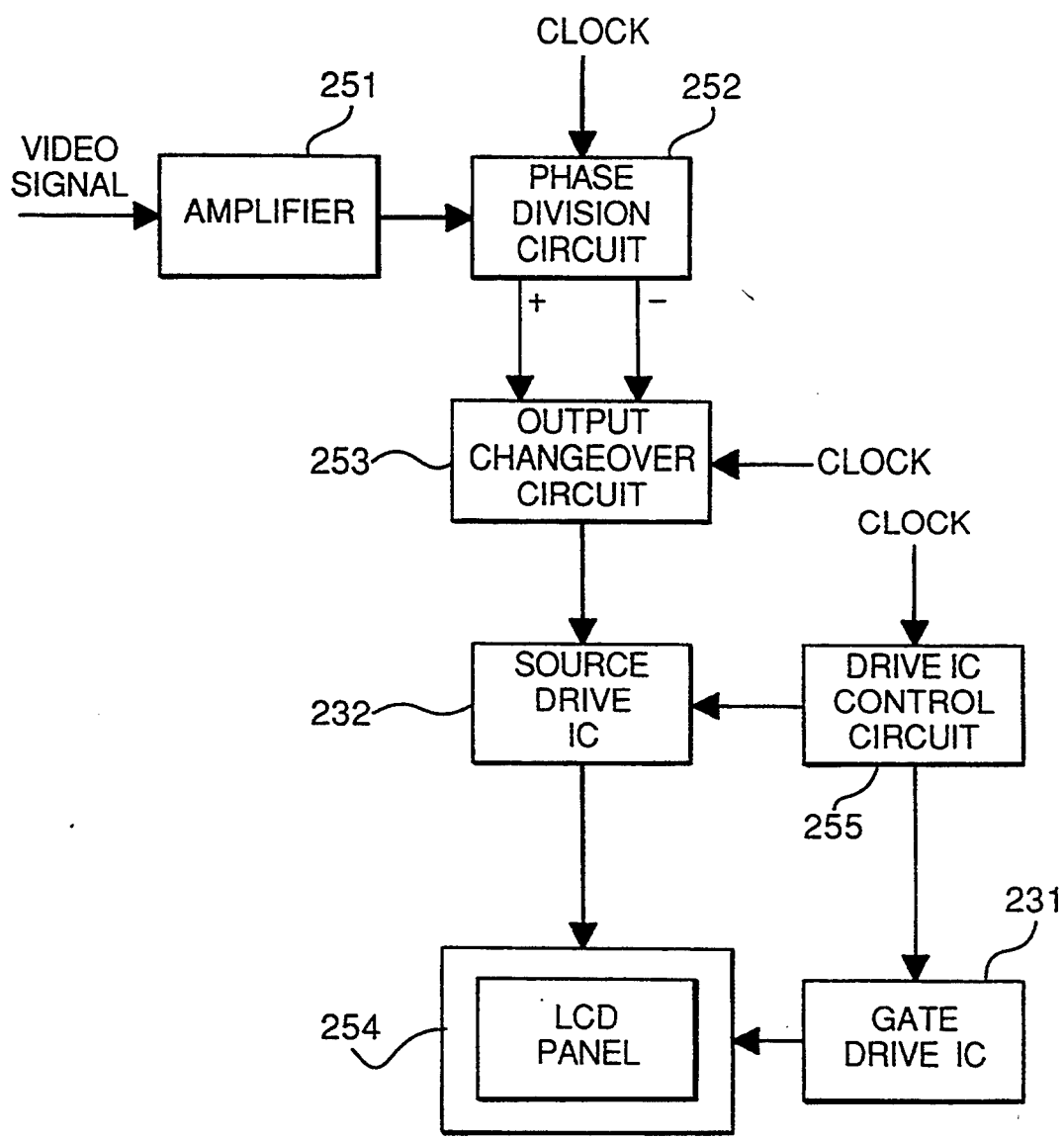
FIG. 25 is a block diagram of a drive circuit of a conventional display device.
Figure 26:
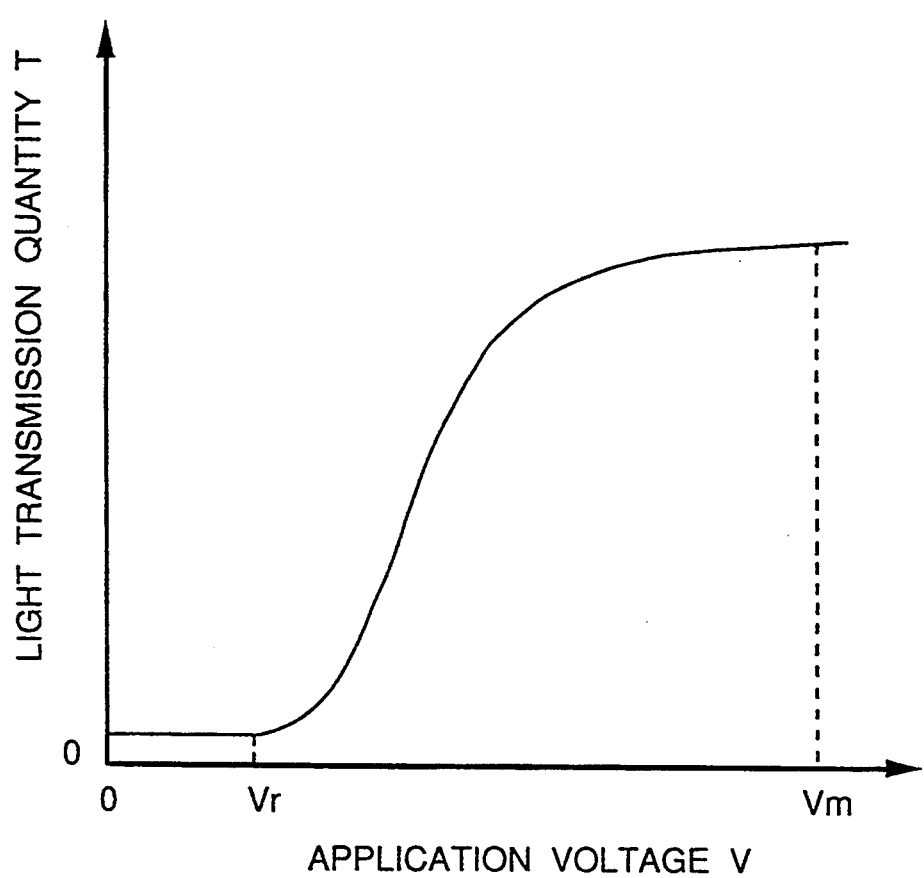
FIG. 26 is a graph showing a relation between an application voltage and a light transmission quantity in an LCD panel.

However, when the film thickness is increased, the saturation voltage $V_m$ and the threshold voltage $V_r$ as shown in FIG. 26 are increased. The source drive IC for driving each pixel is required to output the signals of $+V_m$ and $-V_m$ as shown in FIG. 24. It is difficult to design a drive IC which can yield the voltage $V_m$ not lower than 10 V in regard to its heat resistance and voltage endurance. In TN LCD panels available in commercialization, the voltage $V_m$ is about 7 V at maximum. The greater the pixels increase in amount in an LCD panel, the more difficult for the drive IC to yield a voltage having a great amplitude. This is because the time period for writing a signal per pixel is required to be reduced according as the pixels are increased in amount, and accordingly it is necessary to increase the operation frequency of the source drive IC. In order to obtain a sufficient contrast in an LCD panel employing a polymer dispersion liquid crystals, the thickness of the liquid crystal film is required to be 20 $\mu$m or nearly 20 $\mu$m, where the saturation voltage $V_m$ exceeds 7 V.

FIG. 13 shows a basic construction of an LCD panel common to the display devices of the present invention. However, the liquid crystals 37 are not limited to the polymer dispersion liquid crystals. For instance, a dynamic scattering mode liquid crystals (referred to as the "DSM" hereinafter) can be also used. In the above case, TN liquid crystals can be used therefor with provision of a necessary orientation film or the like.

According to the present invention, the display device is characterized in that a high voltage can be applied to the pixel electrodes. It is now assumed that the TN liquid crystals are used for an LCD panel of the present invention. TN liquid crystal panels include a normally white mode display where a black screen is displayed with voltage application and a normally black mode where a white screen is displayed with voltage application. In the normally white mode display, the higher the application voltage is, the better the black screen display can be achieved. Since a high voltage can be easily applied to the liquid crystals in the display device of the present invention, a high-quality black screen display can be achieved. Therefore, a high-contrast image display can be achieved. It is of course that, by employing the polymer dispersion liquid crystals, the efficiency of light utilization can be improved two or three times higher than that in a display device employing a TN LCD panel thereby to enable the achievement of a high-luminance image display.

Figure 1:
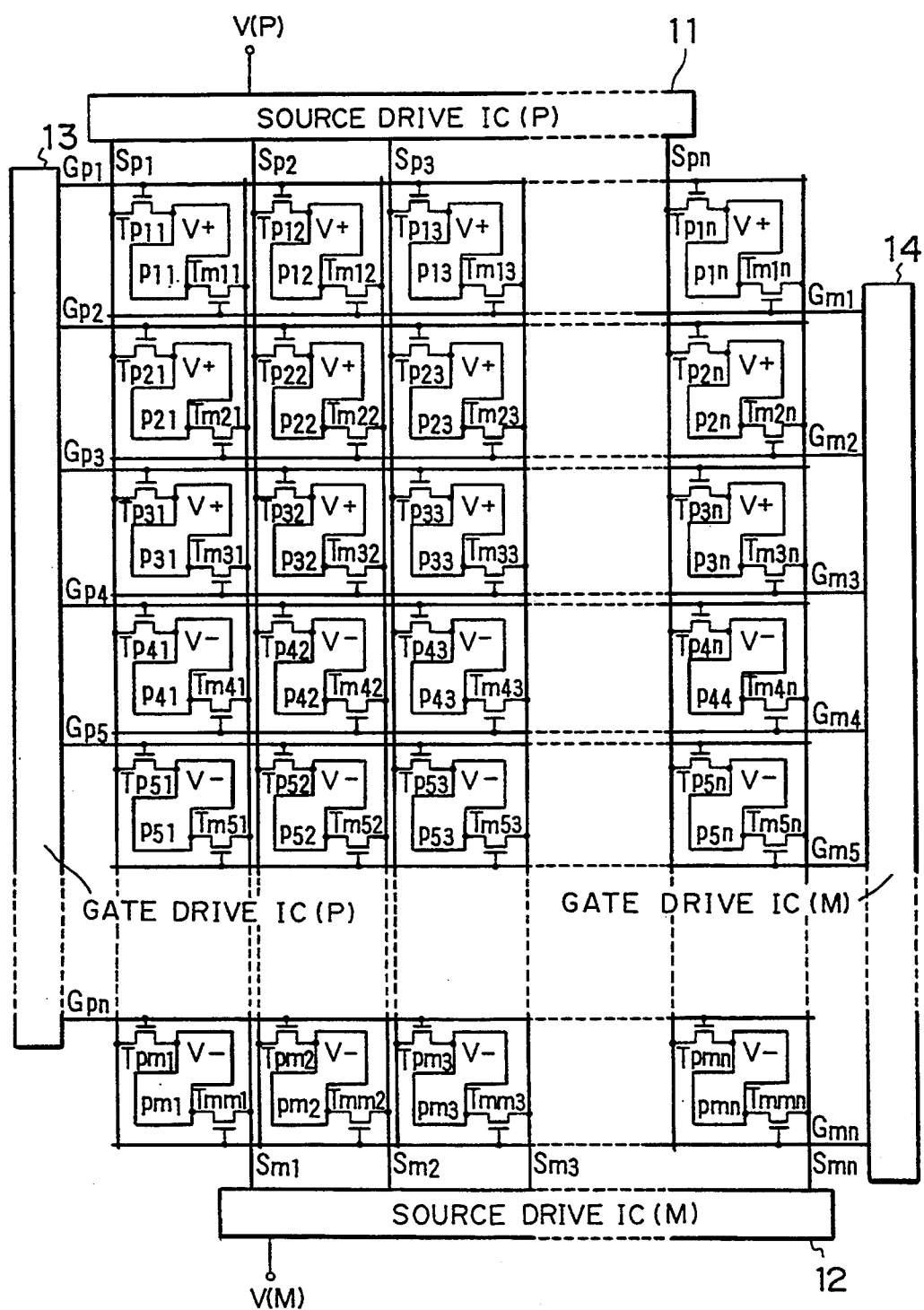
FIGS. 1 and 2 are schematic circuit views of a display device in accordance with a first embodiment of the present invention.

In an LCD panel used for a display device of the present invention, a common electrode (not shown) is preferably formed below the pixel electrode 33 on the array substrate 31 to charge an electric charge in an electrically insulating layer (not shown) interposed between the common electrode and the pixel electrode, in other words, an additional capacitor is formed. This capacitor construction is referred to as the "common electrode system". Other than the common electrode system, there is a previous stage gate system where an additional capacitor is formed between the gate signal line and the pixel electrode. When a plurality of TFTs are formed on one pixel, the aforementioned gate system is accompanied by a great parasitic capacitance to possibly result in reducing the TFT drive capability, which is disadvantageous. An insulating film is formed on adjoining source signal lines, for example, on signal lines $Sm_1$ and $Sp_2$ as shown in FIG. 1. This is because the above-mentioned arrangement prevents the liquid crystals on the signal lines from deteriorating due to a DC voltage applied across the adjoining source signal lines. The above-mentioned arrangement is the matter common to the display devices of the present invention.

EMBODIMENT 1

FIG. 1 shows a schematic construction of a first embodiment of a display device according to the present invention.

Referring to FIG. 1, the reference numerals 11 and 12 denote first and second source drive ICs serving as drive means and also there are provided first and second gate drive ICs 13 and 14 for supplying gate signals. The source drive ICs 11 and 12 and gate drive ICs 13 and 14 may be mounted on an LCD panel by a glass-on-chip technique for mounting the ICs directly on a glass substrate, or the drive ICs may be formed directly on a glass substrate by a semiconductor processing technique. It is also possible to preliminarily mount the source drive ICs on a print board and connect the board to the signal lines of the LCD panel by means of a flexible film substrate.

It is assumed that the source drive IC 11 receives a positive voltage V (P) and outputs a video signal with a positive polarity, while the source drive IC 12 receives a negative voltage V (M) and outputs a video signal with a negative polarity. The source drive IC (P) 11 is referred to as the "SIC (P) 11", while the source drive IC (M) 12 is referred to as the "SIC (M) 12" hereinafter. On the other hand, a gate drive IC (P) 13 is referred to as the "GIC (P) 13", while the gate drive IC (M) 14 is referred to as the "GIC (M) 14" hereinafter. It is noted that $T_{p11}$ through $T_{pmn}$ (generally represented by $T_{pij}$, where i, j are integers 1, 2, ..., n) and $T_{m11}$ through $T_{mmn}$ (generally represented by $T_{mij}$) are TFTs, $P_{11}$ through $P_{mn}$ (generally represented by $P_{ij}$) are pixel electrodes, $S_{p1}$ through $S_{pn}$ and $S_{m1}$ through $S_{mn}$ (generally represented by $S_{pj}$ and $S_{mj}$) are respectively positive and negative source signal lines, and $G_{p1}$ through $G_{pm}$ and $G_{m1}$ through $G_{mn}$ (generally represented by $G_{pi}$ and $G_{mi}$) are respectively positive and negative gate signal lines.

It is further noted that generally a supplementary character p is attached to any component relating to a video signal in positive polarity, while a supplementary character m is attached to any component relating to a video signal in negative polarity in describing the present invention. The SIC (P) 11 and the SIC (M) 12 are so constructed that they can output respectively a signal voltage having an amplitude in a range of $+V_m$ to the common voltage $V_0$ and a signal voltage having an amplitude in a range of $-V_m$ to $V_0$.

As apparent from FIG. 1, in the first embodiment of the display device of the present invention, two TFTs ($T_{pij}$ and $T_{mij}$) are provided on each pixel electrode ($P_{ij}$), and the two TFTs are connected to different gate signal lines ($G_{pi}$ and $G_{mi}$) and different source signal lines ($S_{pj}$ and $S_{mj}$). The above-mentioned type of arrangement of two TFTs attached to one pixel electrode can be seen in the Japanese Patent Laid-Open Unexamined Publication No. SHO 63-18348, which discloses a redundancy given to the pixel construction to prevent the possible defective display of the pixel. While in the display device of the present invention, the plural TFTs are used for inputting the video signals into each pixel electrode.

Furthermore, the source signal lines to which the TFTs ($T_{pij}$ and $T_{mij}$) of each pixel electrode ($P_{ij}$) are connected are different from the source signal lines connected to the TFTs ($T_{pij+1}$ and $T_{mij+1}$) of the pixel electrode ($P_{ij+1}$) adjoining in column. For instance, two TFTs of $T_{p33}$ and $T_{m33}$ are provided on a pixel electrode $P_{33}$, while two TFTs of $T_{p32}$ and $T_{n32}$ are provided on a pixel electrode $P_{32}$ adjoining the above-mentioned pixel. The TFT $T_{p33}$ is connected to a gate signal line $G_{p3}$ and a source signal line $S_{p3}$, while a TFT $T_{m33}$ is connected to a gate signal line $G_{m3}$ and a source signal line $S_{m3}$. In the same manner, the TFT $T_{p32}$ is connected to the gate signal line and a source signal line $S_{p2}$, and a TFT $T_{m32}$ is connected to a gate signal line $G_{m3}$ and a source signal line $S_{m2}$. The above-mentioned TFTs are connected to different source signal lines. In the same manner, the gate signal lines to which the TFTs ($T_{pij}$ and $T_{mij}$) of each pixel electrode ($P_{ij}$) are connected are different from the gate signal lines connected to the TFTs ($T_{pi+1j}$ and $T_{mi+1j}$) of the pixel electrode ($P_{i+1j}$) adjoining in row. In other words, each pixel is provided with two TFTs, two gate signal lines, and two source signal lines.

A two-terminal element such as a diode element or a three-terminal element such as a transistor element can be enumerated as the switching element. Preferably, the three-terminal element such as the transistor element is used. It is also preferred that two switching elements are formed on each pixel electrode.

The following describes the operations of the display device of the first embodiment of the present invention. In the first field, the GIC (P) 13 operates to sequentially supply an on-voltage to each TFT $T_{p1j}$ (j: integer) via the gate signal line $G_{p1}$. In synchronization with the above-mentioned operation, the SIC (P) 11 outputs a signal with a positive polarity to each source signal line $S_{pj}$, where the applied signal is assumed to be $V_+$. When the gate signal line $G_{p1}$ is selected, each TFT $T_{p1j}$ is turned on to write the signal $V_+$ of positive polarity into the pixel electrode $P_{1j}$ arranged in the first row of the matrix. In the same manner, when a gate signal line $G_{p2}$ is selected, each TFT $T_{p2j}$ is turned on to write the signal $V_+$ of positive polarity into each pixel electrode $P_{2j}$ arranged in the second row of the matrix. By repeating the above-mentioned operation up to the last gate signal line $G_{pm}$, the first field is completed.

In the second field scanning operation, the GIC (M) 14 and the SIC (M) 12 are operated. Firstly, when the gate signal line $G_{m1}$ is selected, each TFT $T_{m1j}$ is turned on to write a signal $V_-$ of a negative polarity output from the SIC (M) 12 into each pixel electrode $P_{1j}$. In the same manner, by repeating the above-mentioned operation up to the last gate signal line $G_{mm}$, the second field is completed. When considering the above-mentioned operations regarding to each pixel, the signal written into each pixel electrode changes in polarity every one field, meaning that an AC signal having a cycle of one frame is written into each pixel to drive the pixel. The above-mentioned type of drive method is referred to as the "IF inversion drive".

Figure 5:
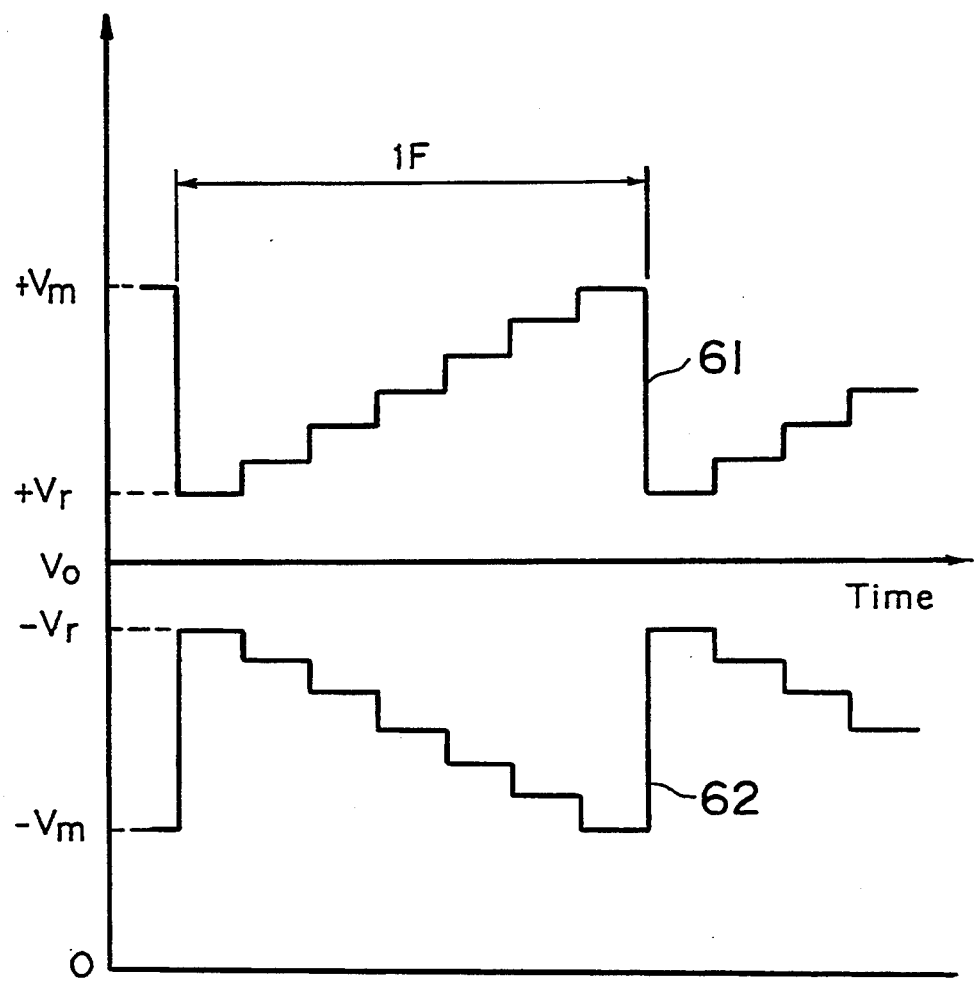
FIG. 5 is an output waveform of a source drive IC of a display device according to the present invention.

FIG. 5 shows an SIC output waveform in displaying a horizontal stripe image on the display device. Referring to FIG. 5, reference numeral 61 denotes an output waveform of the SIC (P) 11, while reference numeral 62 denotes an output waveform of the SIC (M) 12. As shown in FIG. 5, the SIC (P) 11 takes charge of the video signal in positive polarity, while the SIC (M) 12 takes charge of the video signal in negative polarity as described before. Therefore, with regard to each SIC, each SIC outputs only a video signal either in positive or negative polarity. In other words, the resulting signal amplitude can be reduced to half of that of the conventional SIC. For instance, when the conventional SIC outputs a signal having an amplitude of $\pm 7$ V, a total voltage amplitude of $7+7=14$ V is output between the peak of the video signal in positive polarity and the peak of the video signal in negative polarity. In contrast to the above conventional device, each of the SIC (P) 11 and the SIC (M) 12 of the present invention is required to output only a total voltage amplitude of 7 V.

The margin in output amplitude assures the design for yielding a high-amplitude output. In other words, by using the technique of designing the conventional source drive IC, a signal output ranging from 0 V to 14V two times of conventional amplitude 7 V can be assured. When combining the SIC 11 for the operation in positive polarity with the SIC 12 for the operation in negative polarity as in the display device of the present invention, a signal output having an amplitude of $\pm 14$ V can be yielded.

Figure 2:
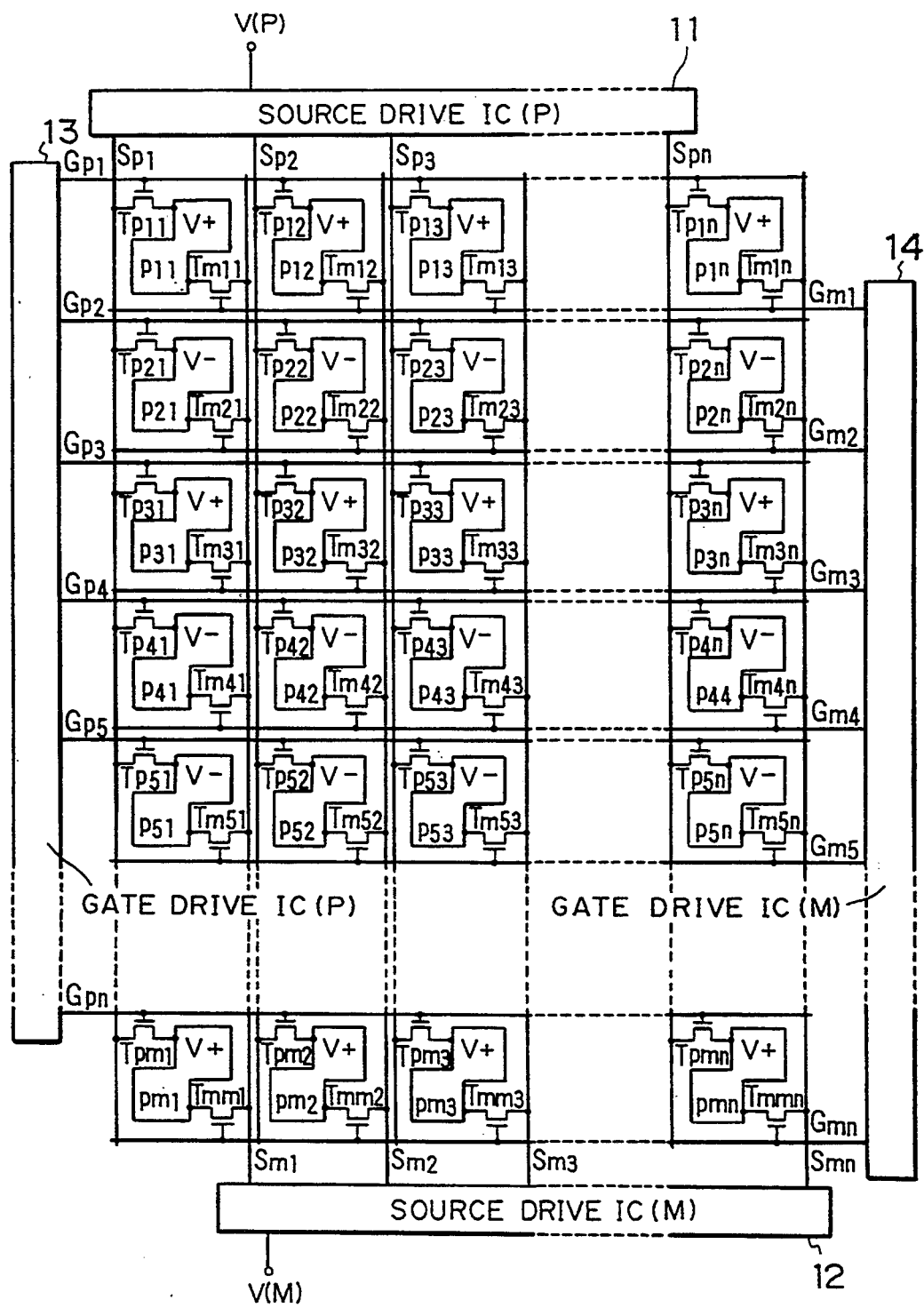

FIG. 2 shows a view for explaining the 1H inversion drive operation in the display device of the first embodiment of the present invention. The GIC (P) 13 and the GIC (M) 14 alternately apply an on-voltage to the gate signal lines, and in this alternate supply of on-voltage, every other gate signal line is selected to receive the on-voltage. The operations of the SIC (P) 11 and the SIC (M) 12 are the same as described hereinbefore. In synchronization with the operation that the GIC (P) 13 selects the gate signal line $G_{p1}$, the SIC (P) 11 outputs the signal $V_+$ to each source signal line $S_{pj}$. Consequently the TFT $T_{p1j}$ is turned on to write the signal $V_+$ into the pixel electrode $P_{1j}$. At the same time, the GIC (M) 14 selects the gate signal line $G_{m2}$ to turn on the TFT $T_{m2j}$ to write the signal $V_-$ output from the SIC (M) 12 into the pixel electrode $P_{2j}$. It is noted here that a line-sequential drive where the GIC (P) 13 selects the gate signal line and the GIC (M) 14 selects the gate signal line $G_{m2}$ after the elapse of one period of 1H can be accepted. Then the GIC (P) 13 selects the gate signal line $G_{p3}$ to turn on each TFT $T_{p3j}$ to write the voltage $V_+$ into each pixel electrode $P_{3j}$. At the same time, the GIC (M) 14 selects a gate signal line $G_{m4}$ to turn on each TFT $T_{m4j}$ to write the voltage $V_-$ into each pixel electrode $P_{4j}$. The above-mentioned operations are repeated up to the last gate signal lines $G_{pm}$ and $G_{mm}$.

In the second field, the GIC (M) 14 selects the gate signal line $G_{m1}$ to write the voltage $V_-$ into the pixel electrode $P_{1j}$. At the same time, the GIC (P) 13 selects the gate signal line $G_{p2}$ ti write the voltage $V_+$ into the pixel electrode $P_{2j}$. Thus the GIC (P) 13 and the GIC (M) 14 select every other gate signal line in the same manner as in the first field to successively write the signals into the pixel electrodes. In the above-mentioned manner, the 1H inversion drive operation can be performed.

Figure 3:
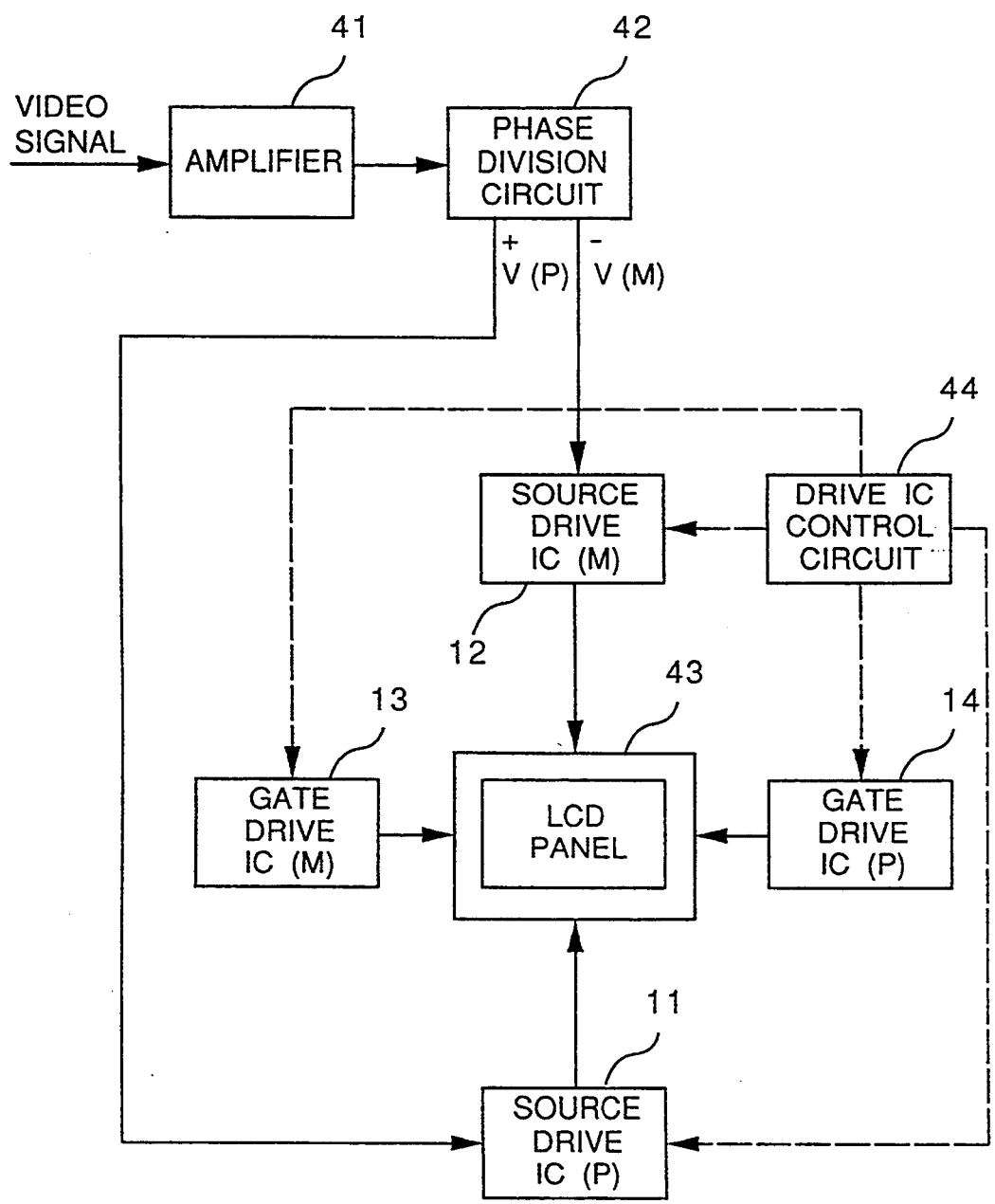
FIG. 3 is a block diagram of a drive circuit of a display device according to the present invention.

FIG. 3 shows a block diagram of a drive circuit for the display device of the present invention. A video signal is subject to a gain adjustment in an amplifier 41 so that the video output amplitude corresponds to the electro-optical characteristics of the liquid crystals. Then the gain-adjusted video signal is input to a phase division circuit 42 to form a video signal of positive polarity and a video signal of negative polarity. The video signal of positive polarity is applied to the SIC (P) 11, while the video signal of negative polarity is applied to the SIC (M) 12.

Figure 4:
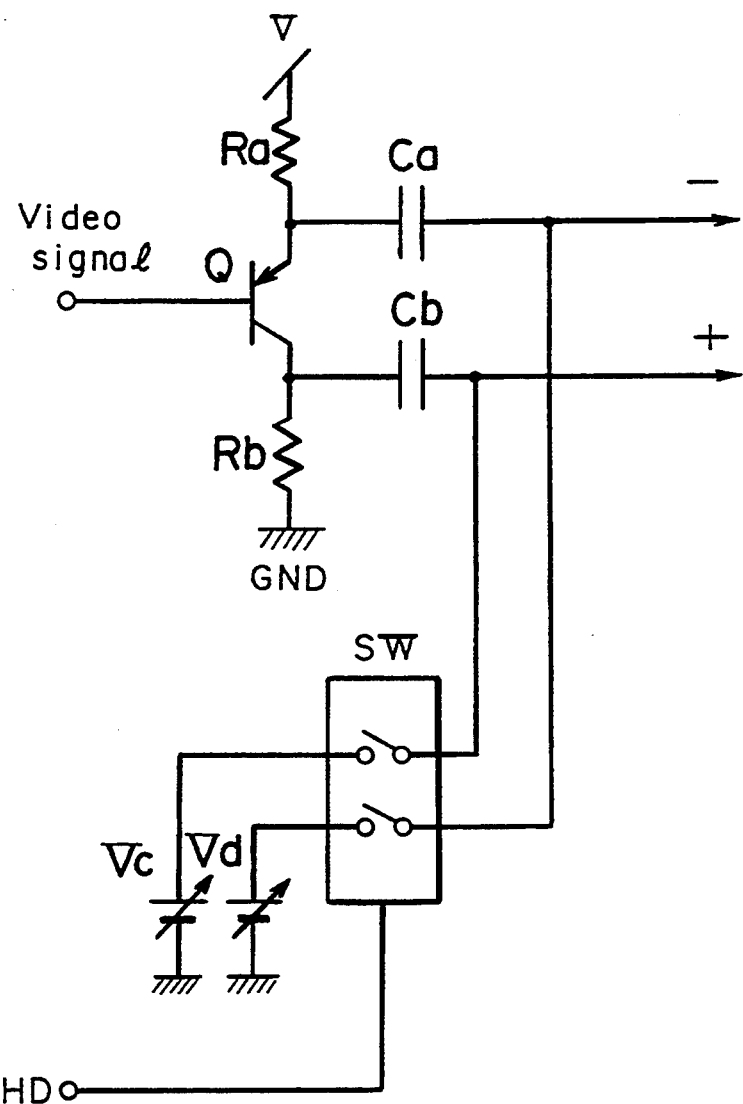
FIGS. 4(a) and 4(b) are circuit diagrams of a part of the drive circuit shown in FIG. 3.
Figure 4:
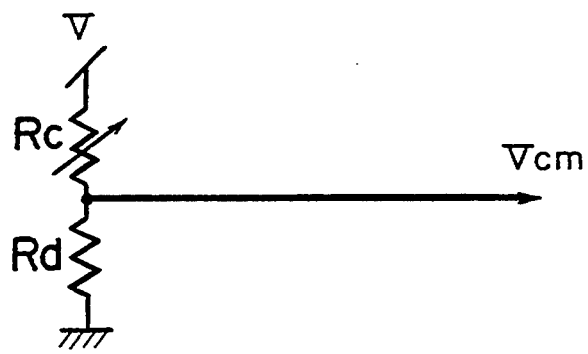

The phase division circuit 42 can be practically constructed of transistors and other parts as shown in FIGS. 4(a) and 4(b). A video signal is applied to the base terminal of the transistor to output a video signal of positive polarity and a video signal of negative polarity respectively from the emitter terminal and the collector terminal of the transistor. DC components of the video signals are cut off by means of capacitors $C_a$ and $C_b$. To each of the above-mentioned signals is added a clamp voltage $V_c$ or $V_d$ ($V_c > V_d$) by a switching operation of a switch SW according to a sync signal HD having the 1H cycle so that the pedestal level is clamped. The clamp voltage is adjusted in accordance with the threshold voltage $V_r$ of the liquid crystals. Consequently the signal of which potential level is clamped is adjusted so that the signal has an appropriate amplitude. The resulting signal of negative polarity is applied to the source drive IC 12, while the signal of positive polarity is applied to the source drive IC 11. It is noted that the above-mentioned drive circuit for the display device of the embodiment is common to the other display devices of the present invention, also accepting a minor modification thereof in design.

Meanwhile, as shown in FIG. 4(b), a common voltage $V_{cm}$ applied to the opposite electrode 35 (see FIG. 13) is adjusted to have an appropriate value through voltage division by means of resistors $R_c$ and $R_d$. When the common voltage deviates from the appropriate value, a flicker occurs with variation of the light transmittance of the liquid crystals. However, in the case of the polymer dispersion liquid crystals, a rough adjustment of the common voltage is permitted because of less flicker occurrence and small variance in transmittance in comparison with the case when the TN liquid crystals are used.

EMBODIMENT 2

Figure 6:
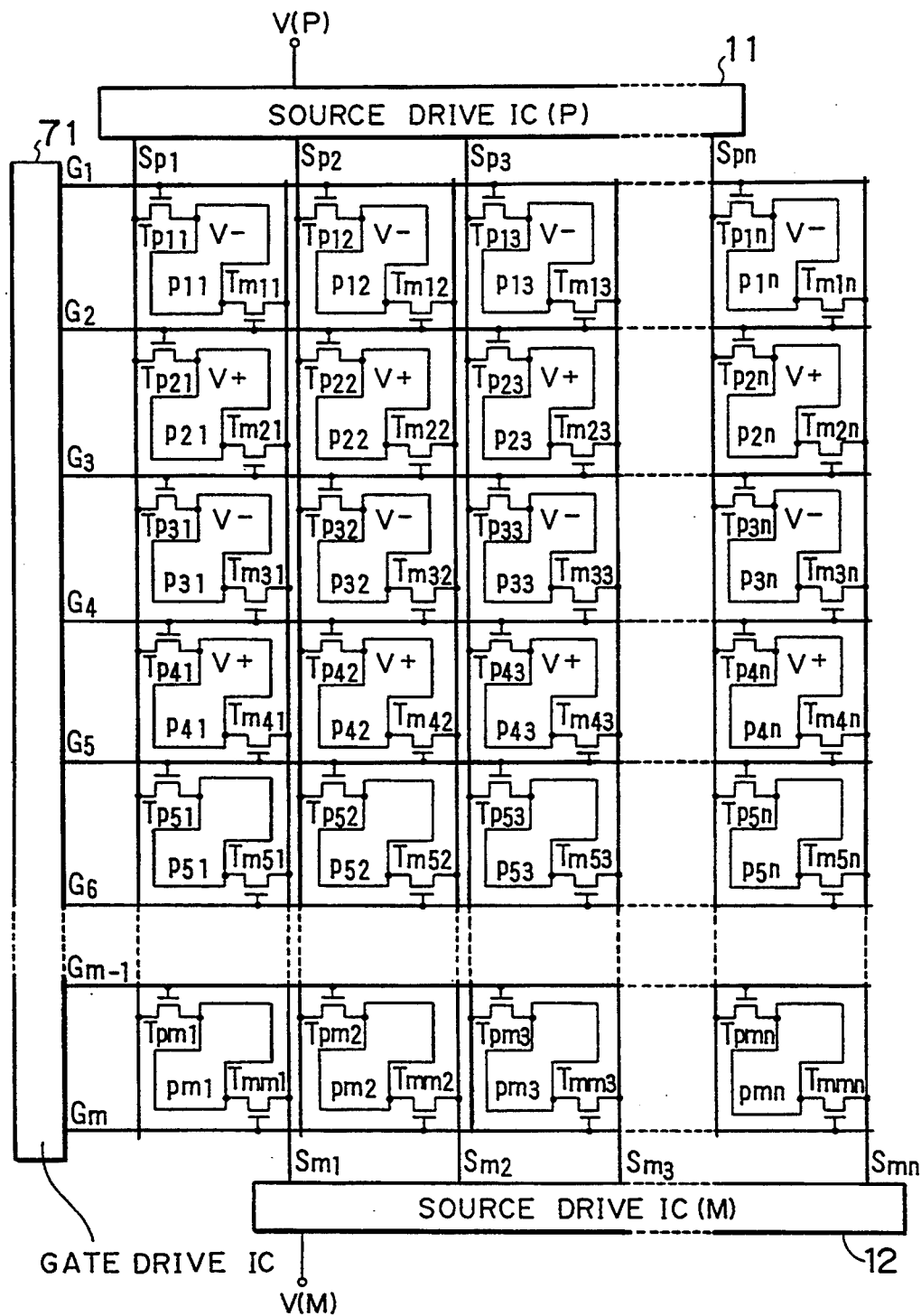
FIGS. 6 and 7 are schematic circuit views of a display device in accordance with a second embodiment of the present invention.
Figure 7:
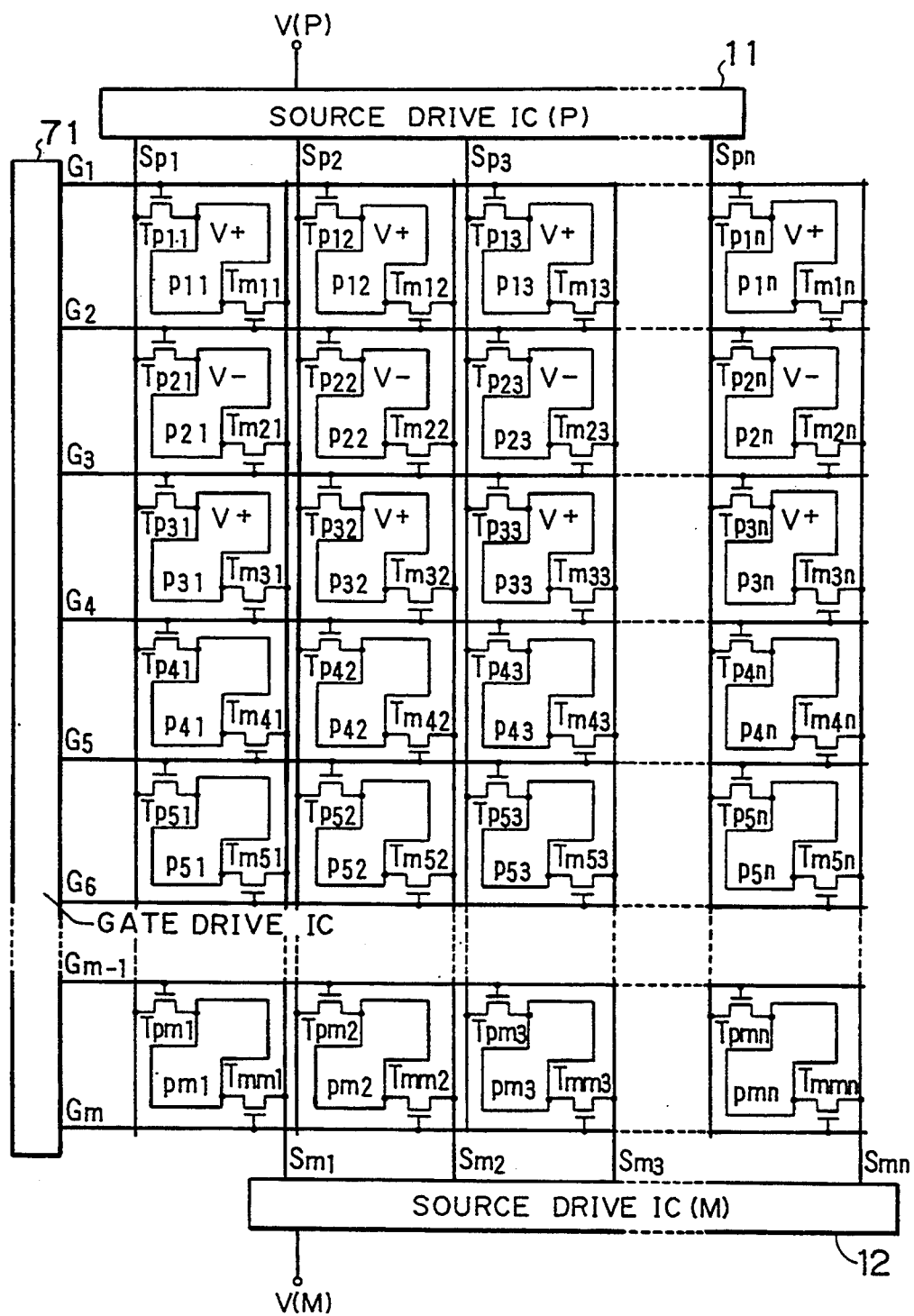

The following describes a display device in accordance with a second embodiment of the present invention with reference to FIGS. 6 and 7.

FIG. 6 shows an LCD panel in accordance with a second embodiment of the present invention. The second embodiment differs from the display device of the first embodiment in that gate signal lines $G_{pi}$ (i: integer) and $G_{mi}$ are common and connected to one gate drive IC 71 (referred to as the "GIC 71" hereinafter). It is of course that TFTs $T_{mij}$ and $T_{pi+1\,j}$ are connected to a common gate signal line $G_{i+1}$. The second embodiment has almost the same construction as that of the display device of the first embodiment of the present invention in the other points, and therefore, no description therefor is provided herein.

The following describes the operations of the display device of the second embodiment of the present invention. In the first field, the GIC 71 outputs an on-voltage to a gate signal line $G_2$. TFTs $T_{m1j}$ and $T_{p2j}$ are turned on, in synchronization with which the signal $V_+$ of positive polarity is output from the SIC (P) 11 and the signal $V_-$ of negative polarity is output from the SIC (M) 12. The signal $V_-$ is written into each pixel electrode $P_{1j}$ by way of each TFT $T_{m1j}$, while the signal $V_+$ is written into each pixel electrode $P_{2j}$ by way of each TFT $T_{p2j}$. Then the GIC 71 outputs the on-voltage to a gate signal line $G_4$ to turn on each TFT $T_{m3j}$ and $T_{p4j}$. In the same manner as described above, the signal $V_+$ is output from the SIC (P) 11 while the signal $V_-$ is output from the SIC (M) 12 in synchronization with the operation clock of the GIC 71, with which the signal $V_-$ is written into each pixel electrode $P_{3j}$ by way of each TFT $T_{m3j}$, while the signal $V_+$ is written into each pixel electrode $P_{4j}$ by way of each TFT $T_{p4j}$. As described above, the GIC 71 sequentially applies the on-voltage to even number signal lines in the first field to write the signals $V_-$ and $V_+$ into the pixel electrodes in every two pixel rows. The SIC (P) 11 and the SIC (M) 12 output the same signals as in FIG. 5 when displaying a horizontal stripe image.

FIG. 7 shows the operation condition in the second field of the display device of FIG. 6. In the second field, the GIC 71 sequentially applies the on-voltage to odd number signal lines. When the on-voltage is applied to the gate signal line $G_1$, each TFT $T_{p1j}$ is turned on to write the output signal $V_+$ supplied by the SIC (P) 11 into each pixel electrode $P_{1j}$. In the same manner, when the on-voltage is applied to the gate signal line $G_3$, the TFTs $T_{m2j}$ and $T_{p3j}$ are turned on so that the output signal $V_+$ supplied by the SIC (P) 11 is written into each pixel electrode $P_{3j}$ and the output signal $V_-$ supplied by the SIC (M) 12 is written into each pixel electrode $P_{2j}$. The above-mentioned operations are repeated up to the gate signal line $G_{m-1}$. Thus the 1H inversion drive operation of the LCD panel is performed, where each pixel is apparently driven by an AC voltage in a cycle of one frame.

According to the second embodiment of the present invention, the gate signal lines is reduced in amount to one half of those of the LCD panel of the first embodiment, and therefore the pixel numerical aperture can be improved and the occurrence of such defects as electric shortcircuit between gate signal lines can be suppressed. As shown in FIG. 5, the SIC (P) 11 and the SIC (M) 12 are designed to yield no such 1H-inversion drive output as in the source drive IC of the conventional display device. In other words, there is no such arrangement that one source drive IC outputs a signal of positive polarity and a signal of negative polarity as shown in FIG. 24, and instead the IC of the present embodiment is fixed to one polarity. As described above, in the second embodiment, there can be attained the same 1H inversion drive operation as in the first embodiment without swinging the output signal from $+V_m$ to $-V_m$ in amplitude.

Referring to FIG. 6, by connecting the even number gate signal lines $G_{2k}$ (k: integer) to the GIC 71 and providing a second GIC 71' connected the odd number gate signal lines $G_{2k-1}$, the GICs pair can perform a sequential scanning. In the first field, the GIC 71 sequentially applies the on-voltage to the even number gate signal lines to write the voltage $V_+$ and $V_-$ into the pixel electrodes. In the second field, the newly added second GIC 71' sequentially applies the on-voltage to the odd number gate signal lines to write the voltage $V_+$ and $V_-$ into the pixel electrodes. In other words, the GIC 71 operates only in the first field scanning, and the newly added second GIC 71' operates only in the second field scanning.

EMBODIMENT 3

Figure 8:
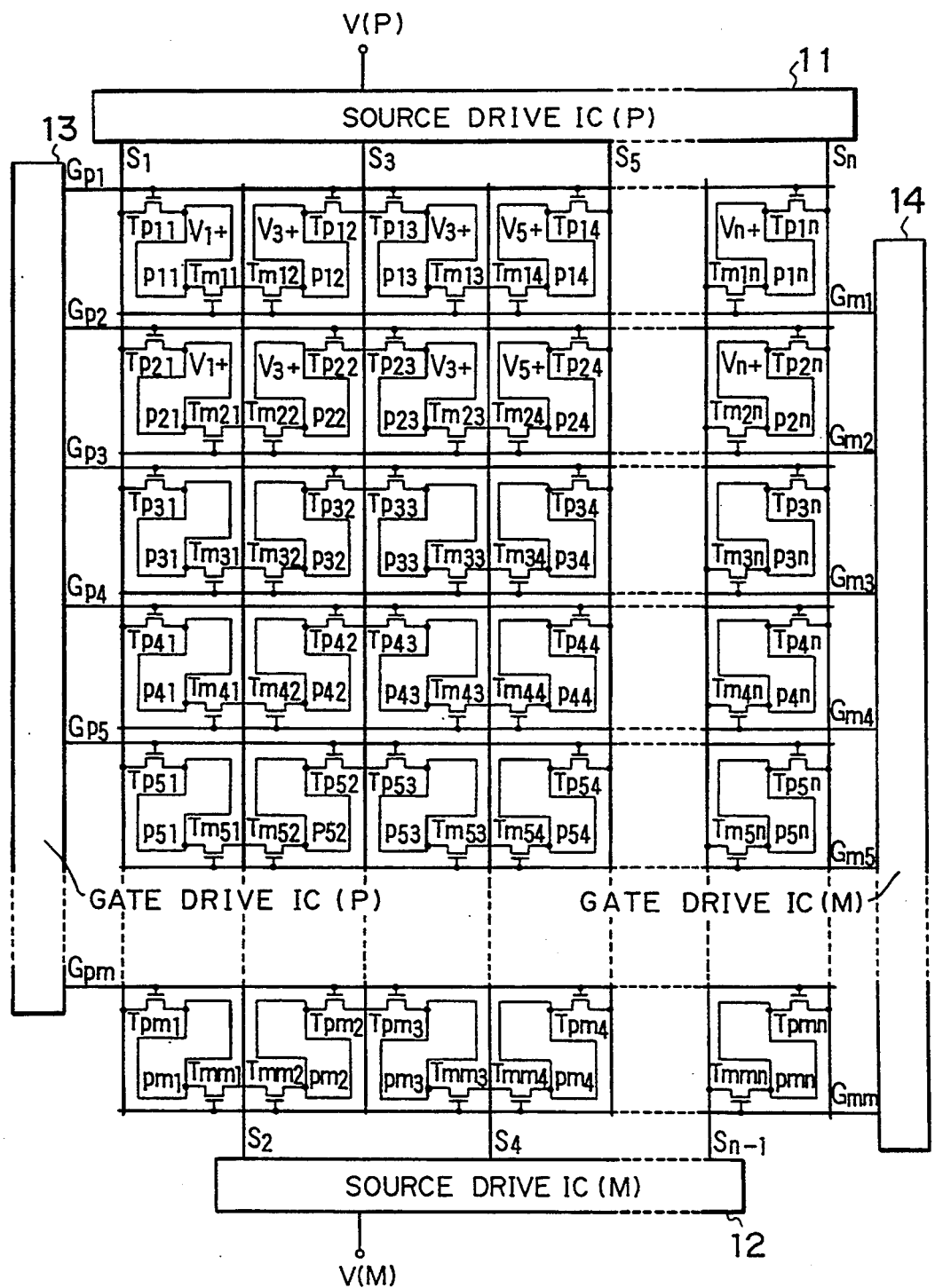
FIGS. 8 and 9 are schematic circuit views of a display device in accordance with a third embodiment of the present invention.
Figure 9:
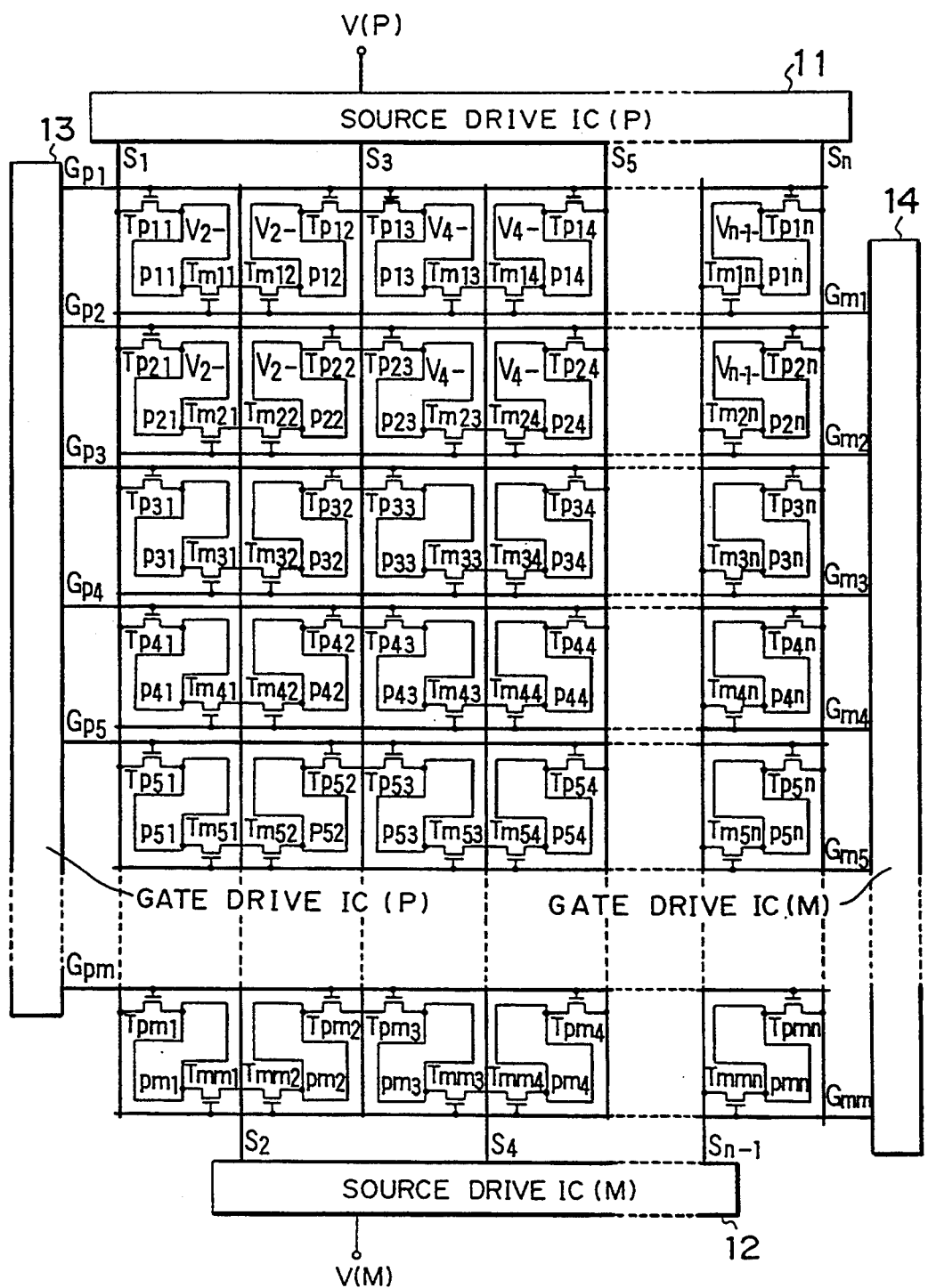

The following describes a display device in accordance with a third embodiment of the present invention with reference to FIGS. 8 and 9.

FIG. 8 shows a display device of the third embodiment of the present invention which differs from the first embodiment in that the arrangement of TFT positions is different and that the amount of the source signal lines is reduced half as drawn vertically alternately to be connected to the SIC (P) 11 and the SIC (M) 12. Although two TFTs $T_{pij}$ and $T_{mij}$ are provided on each pixel $P_{ij}$ in the same manner, the source terminals of the TFTs $T_{mij}$ are connected to the even number source signal lines $S_{2k}$ connected to the SIC(M) 12, while the source terminals of the TFTs $T_{pij}$ are connected to the odd number source signal lines $S_{2k-1}$ connected the SIC(P) 11.

The following describes the operations of the display device of the third embodiment of the present invention with reference to FIGS. 8 and 9. It is assumed that the SIC (P) 11 outputs a signal $V_{j+}$ of positive polarity to each source signal line $S_j$ (j=2k−1), while the SIC (M) 12 outputs a signal $V_{j-}$ of negative polarity to each source signal line $S_j$ (j=2k).

Firstly, in the first field, the GIC (P) 13 operates to apply an on-voltage to a gate signal line $G_{p1}$, and each TFT $T_{p1j}$ is turned on to write the signal $V_{j+}$ output from the SIC (P) 11 into each pixel electrode $P_{1j}$. For instance, a voltage $V_{1+}$ is written into a pixel electrode $P_{11}$, while a voltage $V_{3+}$ is written into pixel electrodes $R_{12}$ and $P_{13}$. Then the GIC (P) 13 shifts the on-voltage output position to apply the on-voltage to a gate signal line $G_{p2}$. Consequently, each TFT $T_{p2j}$ is turned on to write the output voltage of the SIC (P) 11 into each pixel electrode $P_{2j}$. The above-mentioned operations are repeated up to the gate signal line $G_{pm}$ to complete the first field.

The operations in the second field is explained with reference to FIG. 9. In the second field, the SIC (M) 12 and the GIC (M) 14 are operated. Firstly, the GIC (M) 14 outputs the on-voltage to the gate signal line $G_{m1}$. Then each TFT $T_{m1j}$ is turned on to write a signal $V_{2-}$ output from the SIC (M) 12 into each pixel electrode $P_{1j}$ via each TFT $T_{m1j}$. After an elapse of the period of 1H, the on-voltage is applied to the gate signal line $G_{m2}$ to turn on each TFT $T_{m2j}$. Therefore, a voltage $V_{2-}$ is written into each pixel electrode $P_{2j}$. The above-mentioned operations are repeated up to the last gate signal line $G_{mm}$ to complete the second field. With the above-mentioned operations, for instance, the voltage $V_{1+}$ is written into the pixel electrode $P_{11}$ in the first field, and the signal $V_{2-}$ is written into the pixel electrode $P_{11}$ in the second field. Therefore, a display condition where the voltages $V_{1+}$ and $V_{2-}$ are mixed is achieved. In the same manner, the voltage $V_{3+}$ is written into the pixel electrode $P_{12}$ adjoining the above-mentioned pixel in the first field, and the signal $V_{2-}$ is written into the pixel electrode $P_{12}$ in the second field, with which a display condition where the voltages $V_{3+}$ and $V_{2-}$ are mixed is achieved. Generally, the voltages written into adjoining pixels are very alike. Therefore, substantially no difference takes place between the voltages written into an identical pixel electrode in the first field and the second field. Therefore, the construction shown in FIG. 8 is practically permitted. For instance, the on-voltage is applied to the gate signal lines $G_{p1}$ and $G_{m2}$, the voltage $V_{j+}$ is applied to each pixel electrode $P_{1j}$, and the voltage $V_{j-}$ is applied to each pixel electrode $P_{2j}$. After an elapse of the period of 1H, the on-voltage is applied to the gate signal lines $G_{p3}$ and $G_{m4}$, so that the voltage $V_{j+}$ is written into the pixel electrode $P_{3j}$ while the voltage $V_{j-}$ is written into the pixel electrode $P_{4j}$, and thus a sequential drive of the pixel electrodes may be carried out.

The above-mentioned drive method is of inverting in polarity the signals applied to the pixels every one field (which method is referred to as the "1F inversion drive"). By simultaneously operating the GIC (P) 13 and the GIC (M) 14 and applying the on-voltage to every other gate signal line, it is apparent that the 1H inversion drive can be performed in the present embodiment in the same manner as described on the display device of the second embodiment of the present invention.

EMBODIMENT 4

Figure 10:
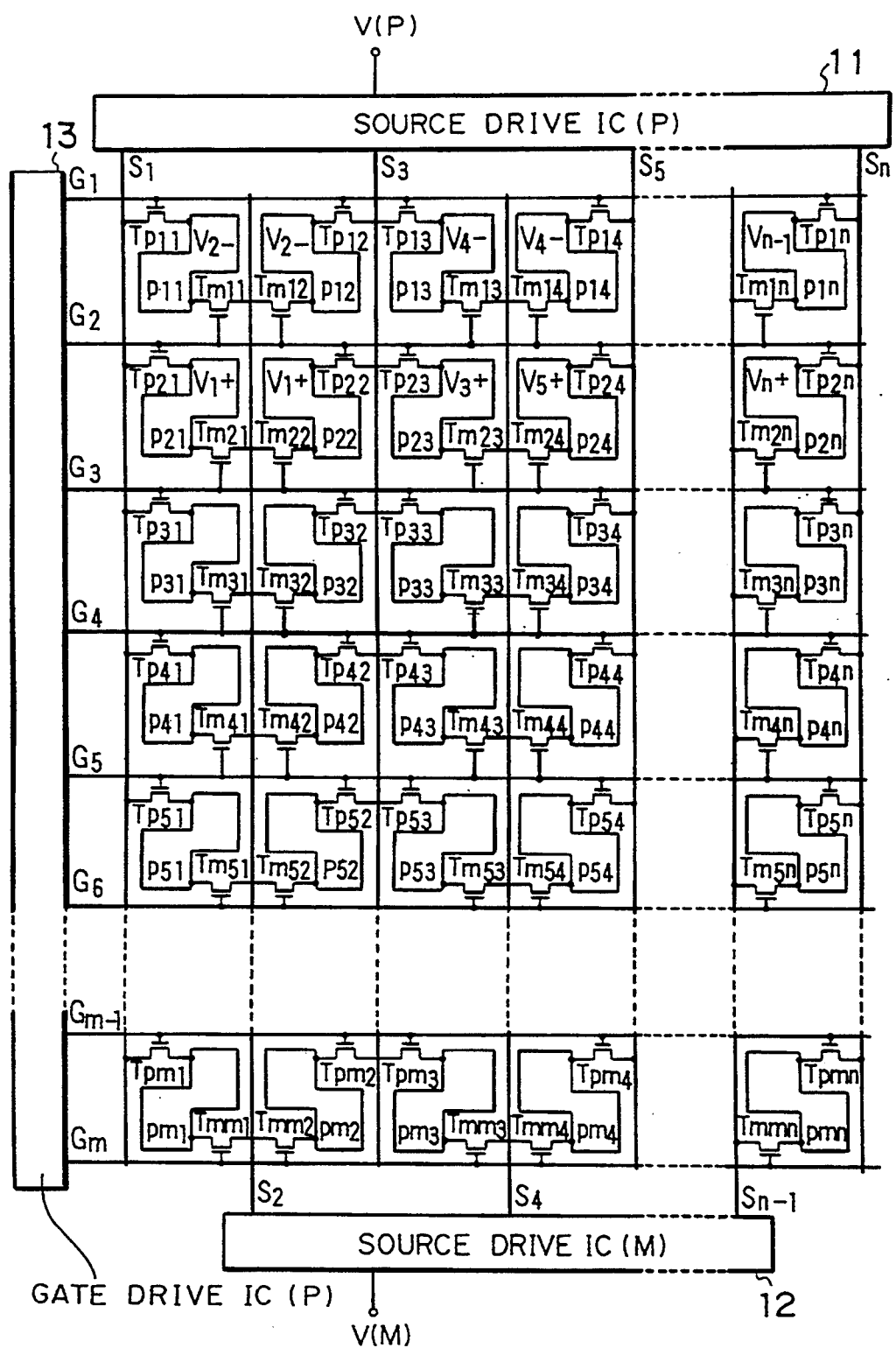
FIG. 10 is a schematic circuit view of a display device in accordance with a fourth embodiment of the present invention.

The following describes a display device in accordance with a fourth embodiment of the present invention with reference to FIG. 10. The fourth embodiment differs from the third embodiment of the present invention in that the gate signal lines $G_{pi+1}$ and $G_{mi}$ are used commonly as each gate signal line $G_i$ which is connected to the GIC 71. The other points of the present embodiment is the same as in the display device of the third embodiment, and therefore no description therefor is provided herein.

Figure 11:
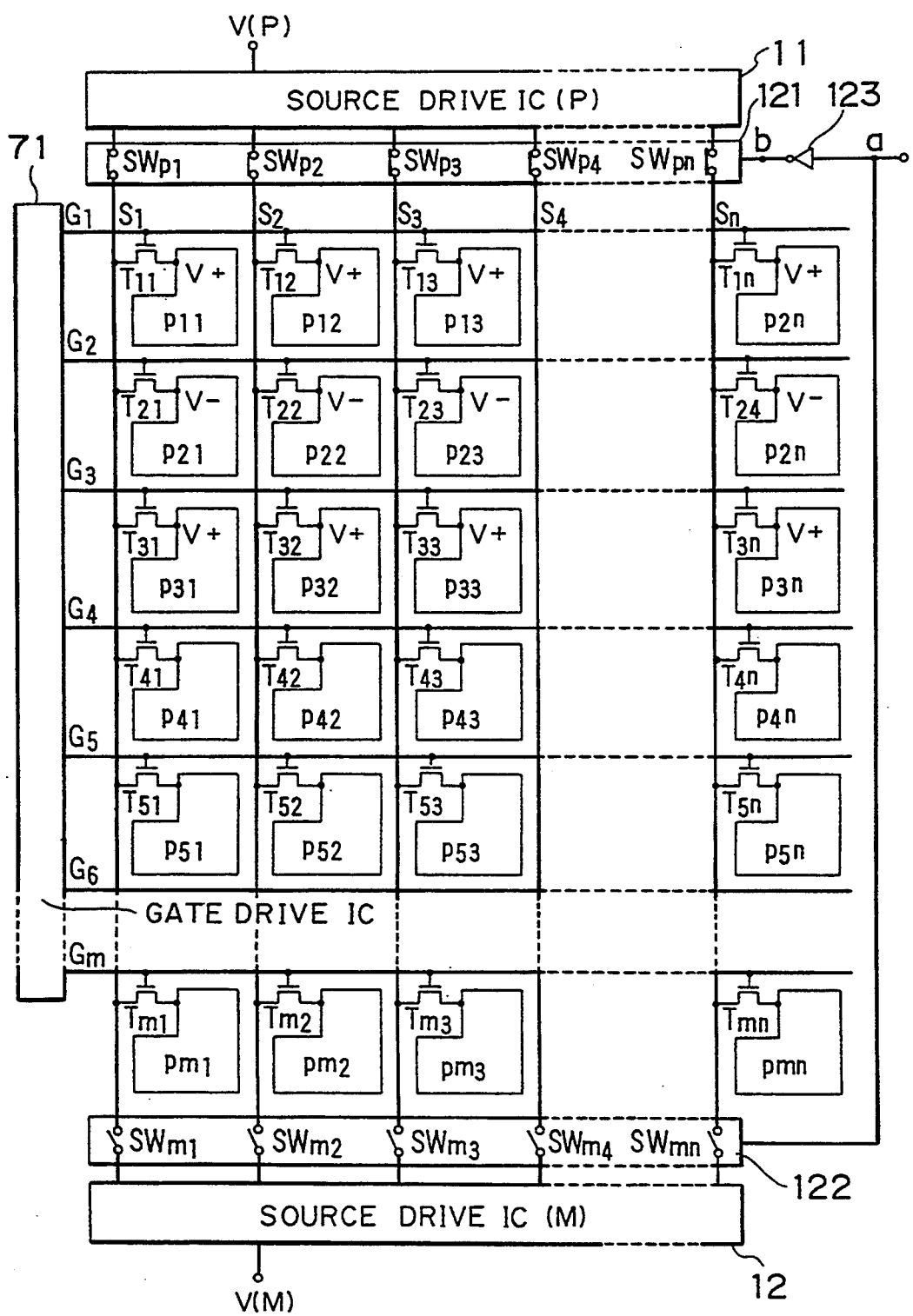
FIGS. 11 and 12 are schematic circuit views of a display device in accordance with a fifth embodiment of the present invention.

The following describes the operations of the display device of the fourth embodiment of the present invention. In the first field, firstly, the GIC 71 applies an on-voltage to the gate signal line $G_2$. Consequently, the TFTs $T_{mij}$ and $T_{p2j}$ are turned on to write the signal applied to the source signal line into the pixel electrodes $P_{1j}$ and $P_{2j}$. The condition at this time is shown in FIG. 11. For instance, the voltage $V_{2-}$ supplied from the SIC(M) 12 via the source line $S_2$ is written into the pixel electrodes $P_{11}$ and $P_{12}$, while the voltage $V_{1+}$ is written into the pixel electrodes $P_{21}$ via a source line $S_3$ and the voltage $V_{3+}$ is written into the pixel electrodes $P_{22}$ and $P_{23}$ via a source line $S_3$ from the SIC(P) 11. After an elapse of the period of 1H, the GIC 71 applies the on-voltage to the gate signal line $G_4$. Consequently, the TFTs $T_{m3j}$ and $T_{p4j}$ are turned on in the same manner as described hereinbefore, and, for example, the voltage $V_{2-}$ is written into a pixel electrode $P_{32}$, while the voltage $V_{3+}$ is written into the pixel electrode $P_{42}$. As described above, the GIC 71 sequentially applies the on-voltage to the even number gate signal lines to complete the first field.

In the second field, the GIC 71 applies the on-voltage to the gate signal line $G_1$. Consequently, the TFT $T_{p1j}$ is turned on and the signal applied to the source signal line from the SIC(P) 11 is written into the pixel electrode $P_{1j}$. Then the on-voltage is applied to the gate signal line $G_3$ to turn on the TFTs $T_{m2j}$ and $T_{p3j}$. Consequently, the signal applied to the source signal line connected to the SIC(M) 12 via the TFT $T_{m2j}$ is written into the pixel electrode $P_{2j}$, while the signal applied to the source signal line connected to the SIC(P) 11 via the TFT $T_{p3j}$ is written into the pixel electrode $P_{3j}$. The above-mentioned operations are repeated up to a gate signal line $G_{m-1}$ (where m−1 is an odd number) to complete the second field.

As described above, signals are written into the pixel electrodes in two rows through selection of one gate signal line. To each pixel electrode the signal of positive polarity and the signal of negative polarity are written in two fields to achieve an AC voltage drive. The drive system is the 1H inversion drive. With regard to one pixel in the above case, different voltages are written into an identical pixel electrode in the first field and the second field in the same manner as in the previous embodiment. However, the above-mentioned arrangement is practically sufficient as described hereinbefore.

In the fourth embodiment, by adopting the construction shown in FIG. 10, the gate signal lines are reduced half in amount as compared with the LCD panel of the third embodiment of the present invention, and therefore the pixel numerical aperture is improved and the occurrence of such defects as electric shortcircuit between gate signal lines can be suppressed. By effecting the 1H inversion drive, no such problem as luminance inclination and flicker occurs thereby to enable the achievement of a high-quality image display.

EMBODIMENT 5

Figure 12:
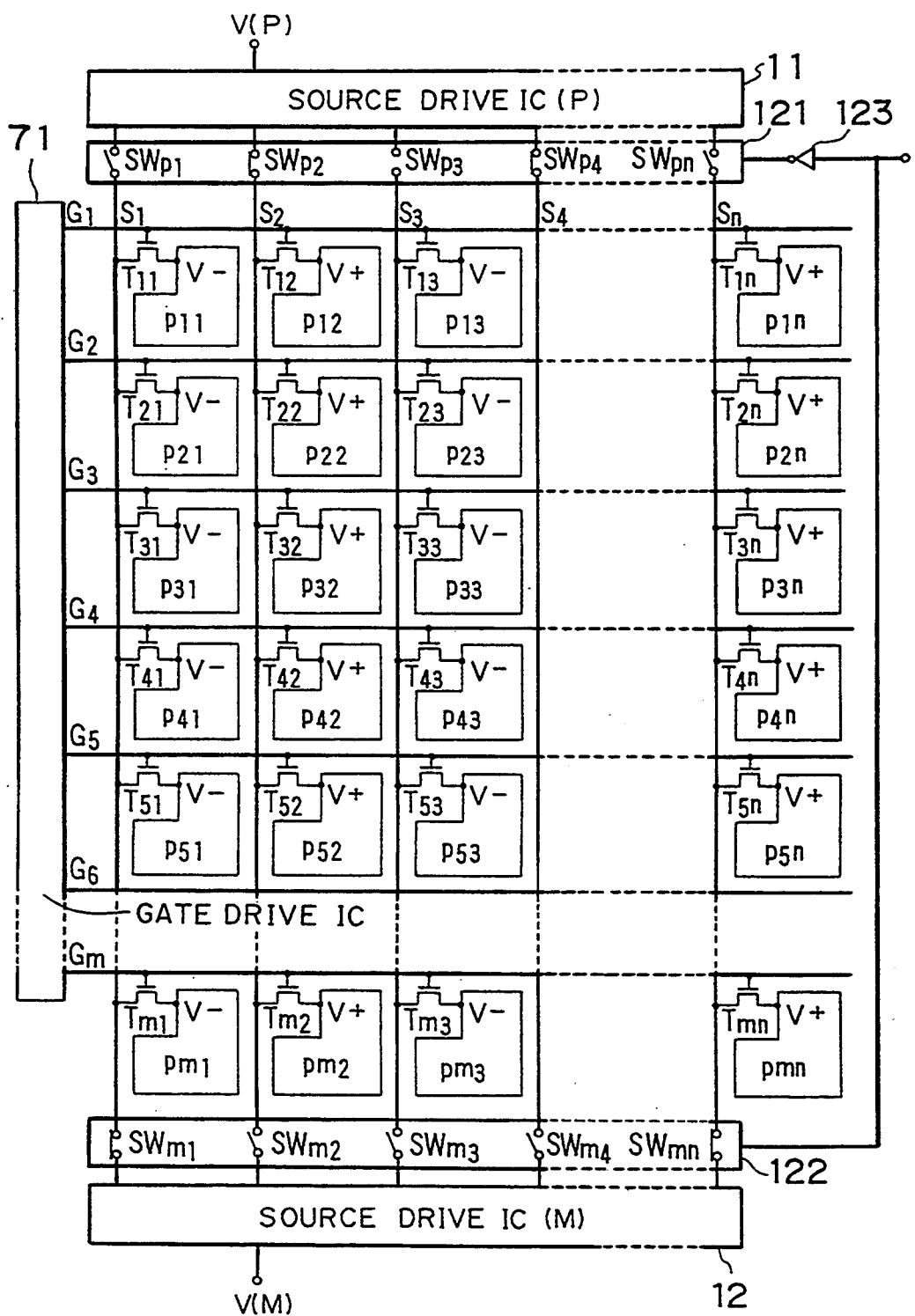

The following describes a fifth embodiment of the present invention with reference to FIGS. 11 and 12.

Referring to FIG. 11, one TFT is provided on each pixel electrode, which constitutes the same pixel arrangement as in the conventional LCD panel. At both ends of each source signal lines $S_j$ are provided the SIC (P) 11 and the SIC (M) 12, and changeover circuits 121 and 122 are respectively connected to the output terminals of the SIC (P) 11 and SIC (M) 12. In more detail, the changeover circuits 121 and 122 are respectively composed of analog switch elements ($SW_{pj}$, $SW_{mj}$). A variety of analog switch units each having a voltage endurance of about ±15 V at maximum are available in commercialization by semiconductor manufacturers. Reference numeral 123 denotes an inverter element in which a logic signal output thereof is toggled in synchronization with a horizontal sync signal HD or a vertical sync signal applied to an input terminal a. For instance, when the inverter element is so designed as to synchronize the output signal with the horizontal sync signal HD, and assuming that the point a is at a high level (referred to as "H level" hereinafter) at an instance, the point a is toggled to a low level (referred to as "L level" hereinafter) at the time the next horizontal sync signal HD is input. Subsequently, the point a repetitively toggles between H level and L level every time the sync signal HD is input. It is noted that the logic level is reversed between the point a and a point b.

It is now assumed that, in each of the changeover circuits 121 and 122 having analog switches $SW_{pj}$ and $SW_{mj}$, when the point a is at L level, each analog switch $SW_{pj}$ is in a low-impedance condition while each analog switch $SW_{mj}$ is in a high-impedance condition. It is further assumed that when the point a is at H level, the analog switch $SW_{pj}$ is in a high-impedance condition while the analog switch $SW_{mj}$ is in a low-impedance condition. As described above, the analog switch units $SW_{pj}$ and $SW_{mj}$ in the changeover circuits 121 and 122 are turned on and off according to the logic level at the point a.

In the above case, there is a control such that the output signal of the SIC (P) 11 and the output signal of the SIC (M) 12 are not simultaneously applied to the source signal lines $S_j$. With the above-mentioned arrangement, there can be achieved a condition where either one of the SIC 11 and the SIC 12 is connected to the source signal lines $S_j$.

The following describes the operations of the display device of the fifth embodiment of the present invention.

Firstly, when the GIC 71 applies an on-voltage to the gate signal line $G_1$, each TFT $T_{1j}$ is turned on. At this time, the analog switches $SW_{pj}$ in the switching circuit 121 are closed to apply the output signal $V_+$ of the SIC (P) 11 to the pixel electrodes $P_{1j}$ via the source signal lines $S_j$. Then the GIC 71 applies the on-voltage to the gate signal line $G_2$ to turn on the TFT $T_{2j}$. At this time, the analog switches $SW_{pj}$ in the switching circuit 121 are opened while the analog switches $SW_{mj}$ in the switching circuit 122 are closed. Therefore, the signal $V_-$ output from the SIC (M) 12 is written into each pixel electrode $P_{2j}$. In the above-mentioned manner, the output signal $V_+$ of the SIC (P) 11 and the output signal $V_-$ of the SIC (M) 12 are alternately written into each pixel electrodes in a unit of row.

In the second field, the signal $V_-$ is written into the pixel electrode $P_{1j}$, while the signal $V_+$ is written into the pixel electrode $P_{2j}$. In the above-mentioned manner, the 1H inversion drive is achieved.

In fifth embodiment of the display device of the present invention, although the array arrangement is not different from that of the conventional LCD panel, a high voltage can be easily applied to each pixel electrode by incorporating the changeover circuits 121 and 122 and providing the SIC (P) 11 which outputs the signal of positive polarity and the SIC (M) 12 which outputs the signal of negative polarity.

It is noted that, although the 1H inversion drive is adopted in the drive system for applying to pixel electrodes an alternating signal which is inverted in polarity every pixel row, it is also easy to achieve a drive system for applying to pixel electrodes an alternating signal which is inverted in polarity every pixel column (referred to as the "1V inversion drive" hereinafter).

FIG. 12 shows a modified example of FIG. 11 for explaining the 1V inversion drive system. Referring to FIG. 12, the analog switches in the changeover circuits 121 and 122 are alternately in the low-impedance condition and the high-impedance condition when the analog switches are in their initial states. For instance, analog switches $SW_p$ and $SW_m$ belonging to odd columns are in the high-impedance condition, while the analog switches $SW_p$ and $SW_m$ belonging to even columns are in the low-impedance condition. There is of course arranged in such a manner that the output signal of the SIC (P) 11 and the output signal of the SIC (M) 12 are not simultaneously applied to the source signal lines $S_j$. In the first field, the signal $V_-$ is applied to each pixel electrode $P_{j1}$ in the first column, while the voltage $V_+$ is applied to each pixel electrode $P_{j2}$ in the second column. In the second field, the signals inverse to the signals in the first field are applied to the pixels.

EXAMPLE 1

Figure 15:
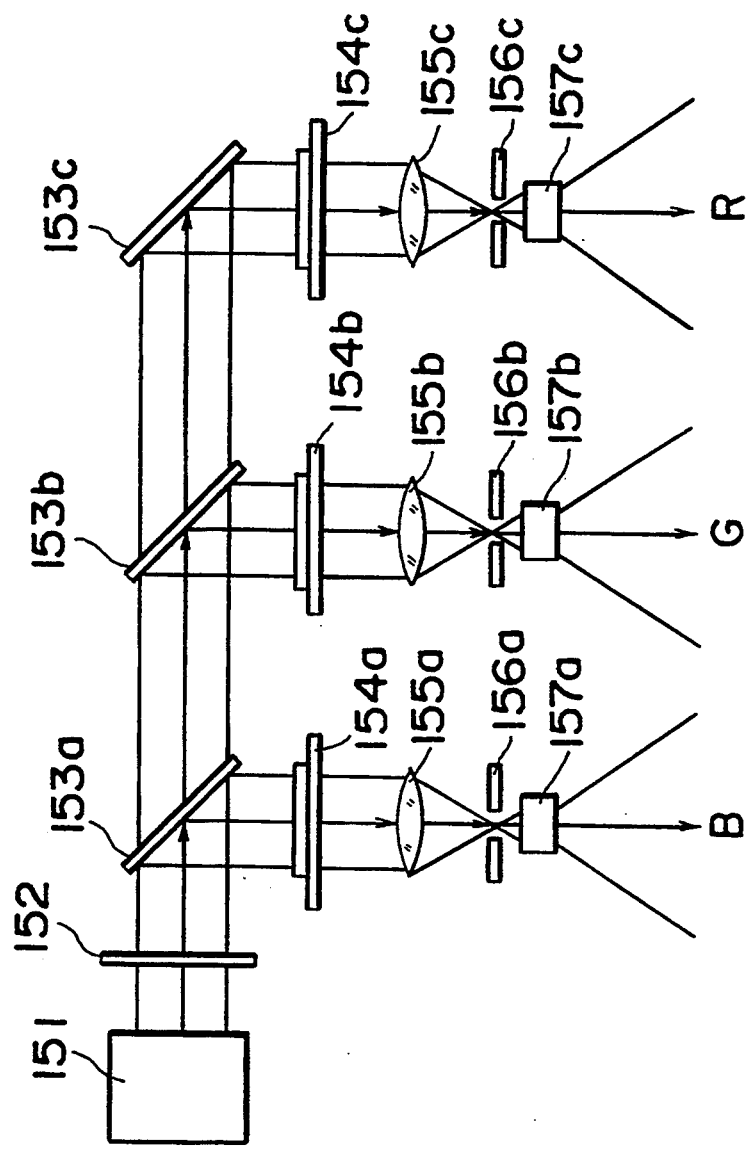
FIGS. 15, 16 and 17 are schematic views each showing an application example of the display device of the present invention to an LCD image projection type television system.

The following describes an LCD image projection type television system employing the display device according to the present invention with reference to FIG. 15. FIG. 15 shows a system for magnifyingly projecting an image on a screen by means of three projection lenses. It is noted here that components unnecessary for explanation are eliminated.

Referring to FIG. 15, reference numeral 151 denotes a light convergence optical system in which a concave mirror as well as a metal halide lamp or a xenon lamp serving as a light emitting means are included. It is preferred that the lamp has an arc length as short as possible. Generally, the xenon lamp has an arc length of 2 mm or shorter to be sufficient for use in the LCD image projection type television system of the present invention. However, the xenon lamp disadvantageously has a short lifetime. A metal halide lamp of around 250 W has an arc length of about 6 mm, which arc length is too long for practical use. The arc length is preferably not greater than 5 mm, and more preferably not greater than 4 mm. There is sold a metal halide lamp having a short arc length if accepting a small power consumption. For instance, a metal halide lamp having a power consumption of 120 W and an arc length of slightly greater than 3 mm is available from Iwasaki Electric Co., Ltd.

In the LCD image projection type television system of the present invention, a metal halide lamp having a arc length of 4 mm or shorter is employed. The concave mirror and the F value of the projection lens can be designed to have appropriate specifications corresponding to the arc length of the lamp. For instance, the F value of the projection lens is set at about F8 when the arc length is 4 mm, or set at about F10 when the arc length is 3 mm. In the present invention, there are actually employed a metal halide lamp having an arc length of 3 mm, a spherical concave mirror, and a projection lens having an F value of F10.

Reference numeral 152 denotes an UVIR cut filter permitting transmission of only visible light by reflecting infrared and ultraviolet rays. Reference numeral 153a denotes a dichroic mirror for reflecting a B (blue) light component (referred to as the "BDM" hereinafter), reference numeral 153b denotes a dichroic mirror for reflecting a G (green) light component (referred to as the "GDM" hereinafter), and reference numeral 153c denotes a dichroic mirror for reflecting a R (red) light component (referred to as the "RDM" hereinafter). It is noted that the order in arrangement of the BDM 153a through the RDM 153c is not limited to the order in arrangement as shown in FIG. 15. It is of course that the last RDM 153c may be replaced by a total reflection mirror.

Reference numerals 154a, 154b, and 154c denote the display devices of the present invention. The display devices of the present invention are used as light valves in the LCD image projection type television system of the present invention. When polymer dispersion liquid crystals are used as liquid crystals, the LCD panel 154c for modulating the R light component is so constructed that the waterdrop-shaped liquid crystal particle diameter or the liquid crystal film thickness is made greater than those of the other LCD panels. The above arrangement is adopted because the light diffusion characteristic is gradually degraded according as the light wavelength becomes longer to consequently reduce the contrast. The diameter of the waterdrop-shaped liquid crystal particle can be controlled by controlling ultraviolet ray in polymerization or by changing the material for use. The thickness of the liquid crystal film can be adjusted by varying the bead diameter of the liquid crystal layer.

Reference numerals 155a, 155b, and 155c denote lenses, reference numerals 157a, 157b, and 157c denote projection lenses, and reference numerals 156a, 156b, and 156c denote aperture stops. It is noted that the parts 155, 156 and 157 constitute a light projection optical system. It is noted that the aperture stops are illustrated to explain the operation of the LCD image projection type television system. The aperture stops are provided for defining the converging angles of the projection lenses, and therefore they can be assumed to be included in the functions of the projection lens. In other words, it can be considered that the aperture size is small when the F value is great. In order to obtain a high-contrast image display, it is better that the projection lenses 157 have greater F values. However, the luminance is reduced in performing a white display when the F values are great.

The following describes the operations of the LCD image projection type television system of the present invention. The modulation systems of the R, G, and B light components have substantially the same operations, and therefore, the modulation system of the B light component is taken as an example for explanation. First, a white light rays are irradiated from the light convergence system 151, and the B light component of the white light is reflected on the BDM 153a. The B light component is incident on the display device 154a. The display device 154a controls the diffusion and transmission conditions of the incident light according to a signal applied to the pixel electrodes 33 as shown in FIGS. 14 (a) and 14 (b) thereby to modulate the light ray.

The diffused light component is condensed by the lens 155a and only parallel light ray component and light ray component in a certain range of angle is transmitted through the aperture 156a. The modulated light ray is projected onto a screen (not shown) through magnification by way of the projection lens 157a. Thus, the B light component is projected on the screen. In the same manner, the display device 154b modulates the G light component, while the display device 154c modulates the R light component to thereby display a color image on the screen.

Although the projection lens system employs an optical system having an aperture stop in the embodiment shown in FIG. 15, the projection lens system of the present invention is not limited to the above-mentioned embodiment. A center-shielding type optical system where a parallel light ray is converged and shielded by a shield to project the resulting diffused light on the screen may be of course used instead.

The switching element of the display device of the present invention is not limited to the TFT. It is apparent that a two-terminal element such as a diode may be used as the switching element.

EXAMPLE 2

Figure 16:
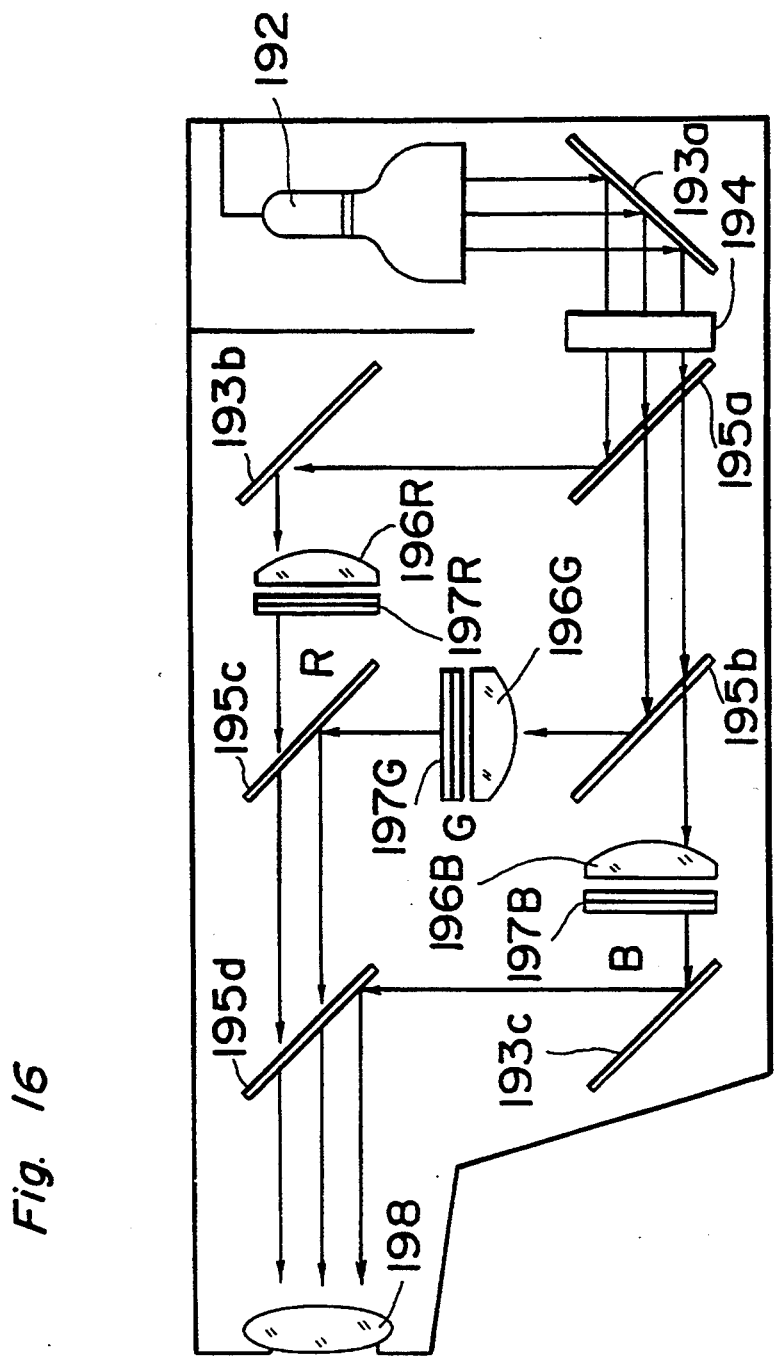

The following describes a second example of an LCD image projection type television system employing the display device according to the present invention with reference to FIG. 16.

Although the first example of the television system in FIG. 15 employs three projection lenses 157, the second example of the LCD image projection type television system employs only a single of projection lens for magnifyingly projecting an image on a screen.

FIG. 16 shows the construction of the second example of the system. It is noted that the same display device as that shown in FIG. 15 is employed.

For simplicity of explanation, it is assumed herein that reference numeral 197G denotes a display device for displaying the G light component, reference numeral 197R denotes a display device for displaying the R light component, and reference numeral 197B denotes a display device for displaying the B light component. Therefore, in regard of the wavelengths of light transmitted and reflected by the dichroic mirrors, the dichroic mirror 195a reflects the R light component and transmit the G and B light components. The dichroic mirror 195b reflects the G light component and transmit the B light component. The dichroic mirror 195d reflects the B light component and transmit the G and R light components.

The light ray emitted from a metal halide lamp 192 is reflected by a total reflection mirror 193a, with which the travel direction of the light ray is changed. Then the light ray components having wavelengths in the ultraviolet region and the infrared region are removed from the light ray by means of a UVIR cut filter 194. The light ray from which the ultraviolet and infrared ray components are removed is separated into three wavelength components of R, G, and B by the dichroic mirrors 195a and 195b, with which the R light component is incident on a field lens 196R by a reflection mirror 193b, the G light component is reflected on the dichroic mirror 195b to be incident on a field lens 196G, while the B light component is transmitted through the dichroic mirror 195b to be incident on a field lens 196B. Each field lens 196 converges each light component, and the display devices 197 (R, G, B) change the orientation directions of the liquid crystals according to corresponding video signals to thereby modulate the light components. Thus the modulated R, G, and B light components are synthesized by the dichroic mirrors 195c and 195d to be projected through magnification on the screen by a projection lens 198.

EXAMPLE 3

Figure 17:
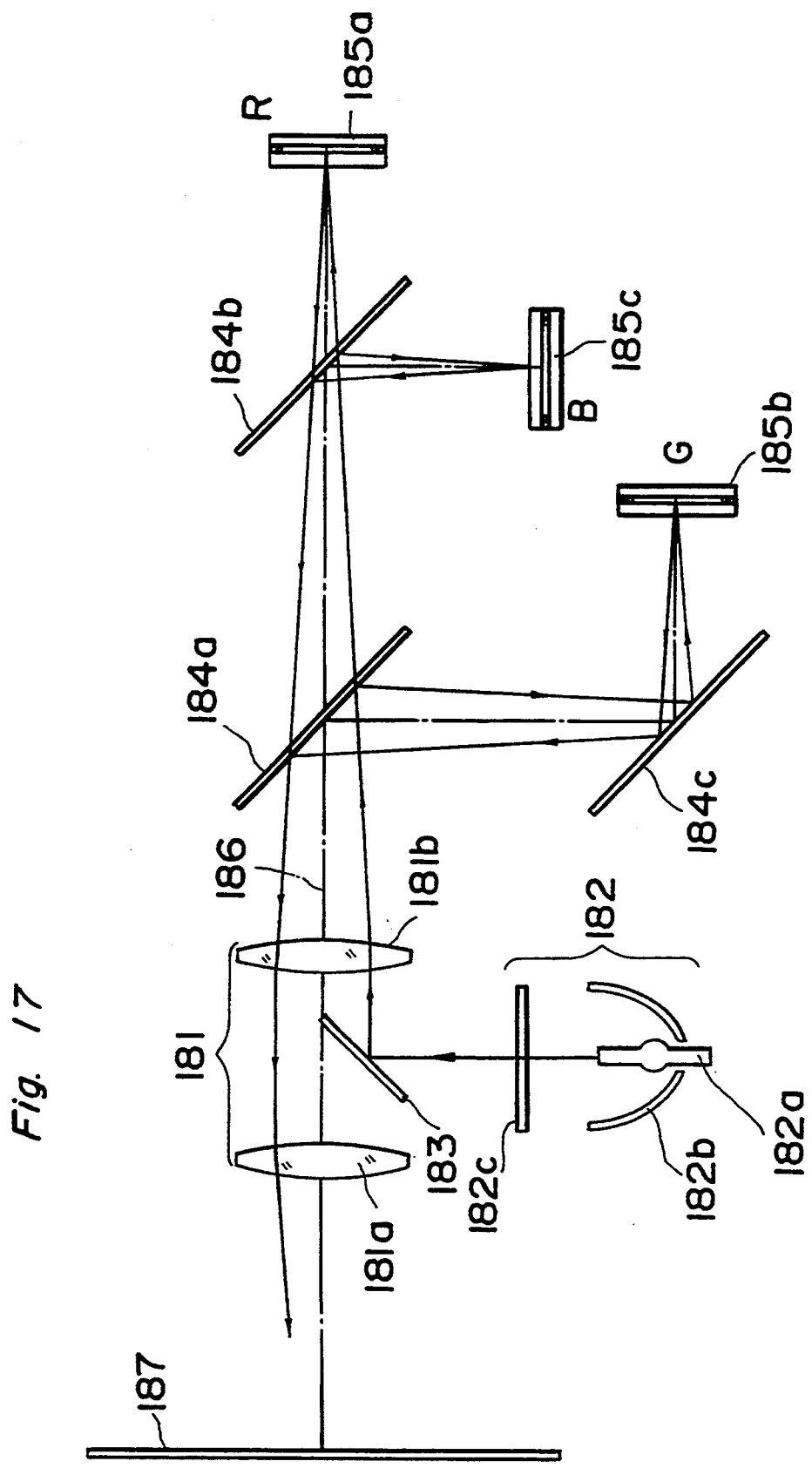

FIG. 17 shows third example of an LCD image projection type television system of a reflection type.

FIGS. 18A–18C show sectional views of a display device used for the reflection type LCD image projection type television system as shown in FIG. 17. The display device shown in FIGS. 18A–18C has the same equivalent circuit and operations as described on the aforementioned embodiments.

Firstly, reference is made to the reflection type display device as shown in FIGS. 18A–18C. On an array substrate 161 there are formed a TFT 163 and other parts for controlling a signal to be applied to a reflection electrode 166 made of aluminum. One terminal of the TFT 163 and the reflection electrode 166 are electrically connected to each other via a contact section 164. The portions other then the contact portion 164 are separated by means of an insulating layer 165. The insulating layer 165 is made of an organic material such as polyimide or an inorganic material such as $S_iO_2$ or $S_iN_x$. The reflection electrode 166 is, after being formed, polished to have a smoothed surface in order to improve the capability as a mirror and increase the reflectance thereof.

An opposite substrate 162 is made of glass, and at the boundary surface in contact with a liquid crystal layer 37 which is the light modulation layer, there is formed an opposite electrode 167 which also has a reflection preventing construction. The opposite electrode 167 is held apart by a specified distance from the reflection electrode 166 by means of a spacer (not shown) or the like. In the space is interposed the polymer dispersion liquid crystals 37 for modulating light. The opposite substrate 162 is composed of, for example, a glass substrate having a thickness of 1 mm and a refractive index of 1.52.

Reference numeral 168 denotes a reflection preventing layer for preventing reflection of light between the atmospheric air and the opposite substrate 162. As the reflection preventing layer 168, there can be available a multi-coat form for reducing the light reflectance in a wide visible light wavelength band or a V-coat form for reducing the light reflectance in a specified wavelength band. When three display devices for modulating the R, G and B light components are employed, the V-coat form shall be adopted. In this case, each display device shares a narrow wavelength band. In order to suppress the reflection light as far as possible in a narrow light band, the V-coat form is appropriate. Therefore, it is preferred that the display devices for modulating the R, G, and B light components shall be each provided with an optimum V-coat form for the peak wavelength $\lambda$ of the corresponding incident light.

In the multi-coat form, three layers of a thin film of $Al_2O_3$ having an optical layer thickness of $\lambda/4$, a thin film of $ZrO_2$ having an optical layer thickness of $\lambda/2$, and a thin film of $MgF_2$ having an optical layer thickness of $\lambda/4$ are formed through deposition. In the case of the V-coat form, two layers of a thin film of $Y_2O_3$ 168b having an optical layer thickness of $\lambda/4$ and a thin film of $MgF_2$ 168a having an optical layer thickness of $\lambda/4$ are formed through deposition as shown in FIGS. 18B–18C. A substance of SiO may be used instead of $Y_2O_3$, however, SiO has a light absorbing band in blue light, and therefore, it is better to use $Y_2O_3$ for the display device for modulating the B light component. It is generally better to use $Y_2O_3$ to obtain a more stable and excellent layer quality.

The opposite electrode 167 formed between the opposite substrate 162 and the liquid crystal layer 37 is composed of three layers 167a, 167b and 167c. More in detail, the opposite electrode 167 serving as a reflection preventing film is formed by forming thin films 167a and 167c on and beneath a transparent conductive thin film 167b which serves as the opposite electrode layer. The opposite electrode 167 having the reflection preventing structure is referred to as the "reflection preventing electrode" hereinafter. The reference numeral 167b denotes an ITO layer which serves as the opposite electrode. The film thickness of the ITO layer is designed to have an optical layer thickness of $\lambda/2$. When the peak wavelength $\lambda$ of an incident light is 550 nm, the thickness d is about 1375 Å. The ITO layer thickness is formed in correspondence with the wavelength $\lambda$. The thin films 167a and 167c are each comprised of a substance having a refractive index of n which is in a range between the refractive index of the opposite substrate 162 and the refractive index of the ITO layer 167b. It is preferred that the thin films 167a and 167c are made of the same substance and to the same thickness. Each of the thin films 167a and 167c has an optical layer thickness of $nd = \lambda/4$. It is noted that the reference character d denotes the physical layer thickness.

As the material for the thin films 167a and 167c, there can be enumerated aluminum oxide ($Al_2O_3$), yttrium oxide ($Y_2O_3$), silicon monoxide (SiO), magnesium oxide (MgO), tungsten oxide ($WO_3$), cerium fluoride ($CeF_3$), and lead fluoride ($PbF_2$). Among these materials, $Al_2O_3$, $Y_2O_3$, and $CeF_3$ are preferred in regard of substance stability, light transmittance, and film uniformity. The substance SiO (n $\approx$ 1.7) can remarkably suppress the reflectance in a wide range of visible light.

Assuming that $\lambda$ is 550 nm, it is preferred that each of the thin films 167a and 167c has a film thickness d ranging from 700 Å to 1000 Å when made of $Al_2O_3$ (n=1.63), while the ITO layer (n$\approx$2.0) 167b has a film thickness ranging from 1150 Å to 1600 Å. The thin film 167c is to reduce the voltage applied to the ITO film 167b, however, almost no influence is exerted when the thin film 167c have a film thickness of d=1000 Å or smaller. Conversely, the above-mentioned arrangement provides the effects of preventing the possible elusion of unnecessary substance from the opposite substrate 162 while increasing the retention of the liquid crystal layer 37. Furthermore, the ITO layer can obtain a necessary and sufficient resistance by layer formation through deposition or sputtering at a temperature of 200° C. or above when the ITO layer thickness is 1000 Å or greater. When the thin film 167a is made of $Y_2O_3$ (n=1.78), it is preferred that the film thickness d ranges from 650 Å to 900 Å.

As a result of a study, use of the substance $Y_2O_3$ for the thin films 167a and 167c enables the remarkable reduction of reflectance throughout almost the entire range of visible light when the ITO film has a refractive index n of about 2.0. When the refractive index n of the ITO layer is smaller than 1.9, use of the substance $Al_2O_3$ enables the remarkable reduction of reflectance in the range of visible light. The above result is provided that the refractive index exhibited when the polymer dispersion liquid crystals 37 diffuse is greater than the refractive index of the opposite substrate 162.

The refractive index of the ITO layer exerts an influence on an incident light when the light incident on the liquid crystal layer is diffused in the polymer dispersion liquid crystals 37 and transmitted again through the ITO layer. When the refractive index of the ITO layer is high, the light is reflected to enter again into the liquid crystal layer 37 to result in increasing the rate of causing secondary diffusion of light. Therefore, it is preferred that the refractive index of the ITO layer is suppressed as far as possible. For the above reasons, the ITO 167b is made to have a refractive index slightly greater than 1.8 and the thin films 167a and 167c are made of $Al_2O_3$ (n$\approx$1.63) in the reflection type display device of the present invention.

By forming the reflection preventing electrode 167 in a manner as described above, the light reflectance can be remarkably reduced, and a reflectance of 0.1% or less at peak wavelength $\lambda$ can be achieved when the light to be modulated has a relatively narrow band. The ITO layer 167b is of course constructed or formed so that it can receive the common voltage.

Figure 19:
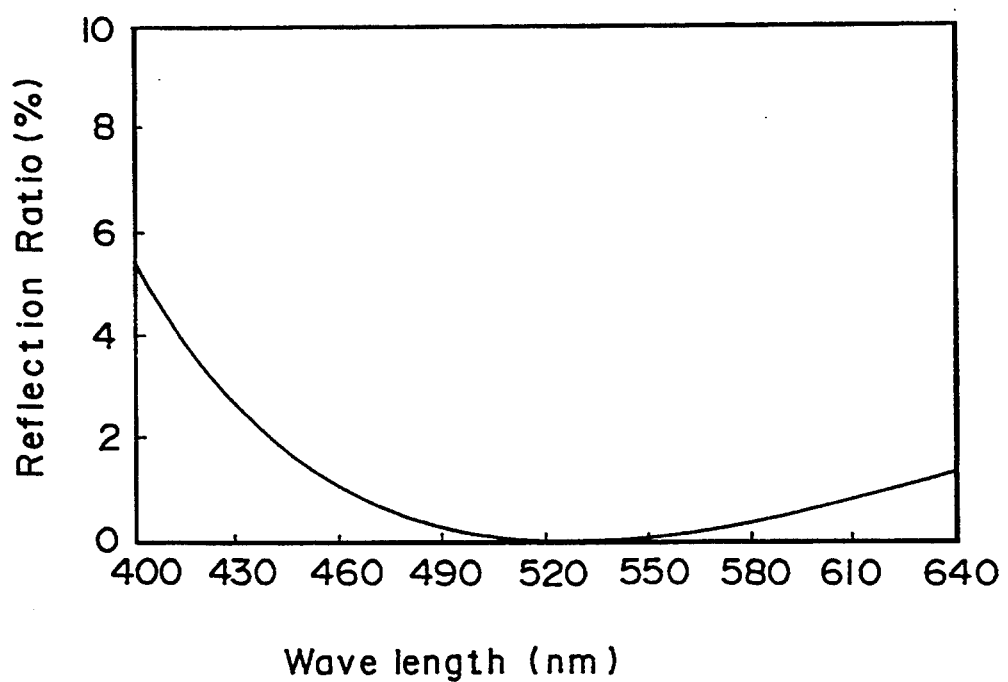
FIG. 19 is a graph showing a relation between the incident light wavelength and the reflectance of a display device according to the present invention.

The reflectance of the display device with respect to incident light wavelengths is shown in the graph of FIG. 19. The peak wavelength $\lambda$ in the design stage is set at $\lambda$=535 nm. The reflection preventing film 168 is a V-coat film, while the reflection preventing electrode 167 has a three-layer construction of $Al_2O_3$, ITO, and $Al_2O_3$. As apparent from the graph, a remarkably low reflectance is achieved around the wavelength of 530 nm.

When deviating from the peak wavelength, the reflectance of the display device increases, however, there is no problem when the display device is used for the LCD image projection type television system. This is because three display devices are used in the LCD image projection type television system, and each display device modulates a light component in a narrow light band. Regarding the band of light incident on the display devices, the half band width of the incident light is about 50 nm in the display devices for G and B light components, and 90 nm in the display device for the R light component. As apparent from FIG. 19, in the range of ±25 nm around the peak wavelength, the reflectance is significantly low.

FIG. 17 shows a reflection type LCD image projection type television system employing the reflection type display device as shown in FIG. 18.

Referring to FIG. 17, reference numerals 185a, 185b, and 185c denote reflection type display devices (each of which is represented by reference numeral 185 hereinafter) as shown in FIG. 18. A light source 182 is composed of a lamp 182a, a concave mirror 182b, and a filter 182c. The lamp 182a is a metal halide lamp having an arc length of 4 mm or shorter in the same manner as those in FIGS. 15 and 16. The concave mirror 182b is made of glass, and a multi-layer film for reflecting visible light and transmitting infrared and ultraviolet rays are deposited on a reflection surface of the mirror. The visible light component included in the light from the lamp 182a is reflected on the reflection surface of the concave mirror 182b. Infrared and ultraviolet rays are removed from the light reflected on the concave mirror 182b by means of a filter 182c.

The projection lens 181 is comprised of a first lens group 181b disposed on the side of the display device 185 and a second lens group 181a disposed on the side of a screen. Between the first lens group 181b and the second lens group 181a is provided a plane mirror 183. Diffused light emitted from a pixel located at the center of the screen of each display device 185 is transmitted through the first lens group 181b, where a lower half of the light with respect to the optical axis 186 in the figure is incident on the plane mirror 183, and the remaining light are incident on the second lens group 181a instead of being incident on the plane mirror 183. The normal of the plane mirror 183 is inclined at an angle of 45° with respect to the optical axis 186 of the projection lens 181.

The light emitted from the light source 182 is reflected on the plane mirror 183 and transmitted through the first lens group 181b to be incident on the display device 185. Light reflected on the display device 185 is transmitted through the first lens group 181b and the second lens group 181a in this order to reach the screen 187. The optical system is designed in such a manner that a light ray emitted from the center portion of the projection lens 181 and directed along the optical axis 186 to the display device 185 is incident on the liquid crystal layer 37 of the display device approximately perpendicularly, i.e., in a telecentric manner.

Herein for simplicity of explanation, it is assumed that the display device 185b modulates G light component, the display device 185c modulates B light component, and the display device 185a modulates R light component.

Referring to FIG. 17, reference numerals 184a, 184b, and 184c denote dichroic mirrors which concurrently serve as a color synthesis and color separation system. White light emitted from the light source 182 is reflected by the plane mirror 183 to be incident on the first group 181b of the projection lens 181. In the above case, unnecessary light components are cut off by the filter 182c having its half band width of 430 nm to 690 nm. Hereinafter, each light band is represented by its half band width value. The dichroic mirror 184a reflects G light component and transmit the R and B light components. The G light component is subjected to band limitation by the dichroic mirror 184c to be incident on the display device 185b. The band of the G light component is made to be 510 to 570 nm. On the other hand, the dichroic mirror 184b reflects the B light component and transmits the R light component. In the similar manner, the B light component is incident on the display device 185c, while the R light component is incident on the display device 185a. The incident B light component has a band of 430 nm to 490 nm, while the R light component has a band of 600 nm to 690 nm. Each display device forms an optical image in the form of a change of light diffusion condition according to a corresponding video signal. Optical images formed by the display devices are chromatically synthesized by the dichroic mirrors 184a and 184b and then incident on the projection lens 181 to be projected through magnification on the screen 187. It is noted that the R, G, and B light components have almost the same band widths in the LCD image projection type television system of the present invention.

By using the reflection type display device having a high contrast and a high pixel numerical aperture, a high-luminance image display can be achieved. Furthermore, since no obstacle exists behind the display device, the display panel can be easily cooled. For instance, a forced air cooling from behind the panel can be easily performed, and a heat sink or the like can be easily attached to the rear surface of the panel.

EXAMPLE 4

Figure 20:
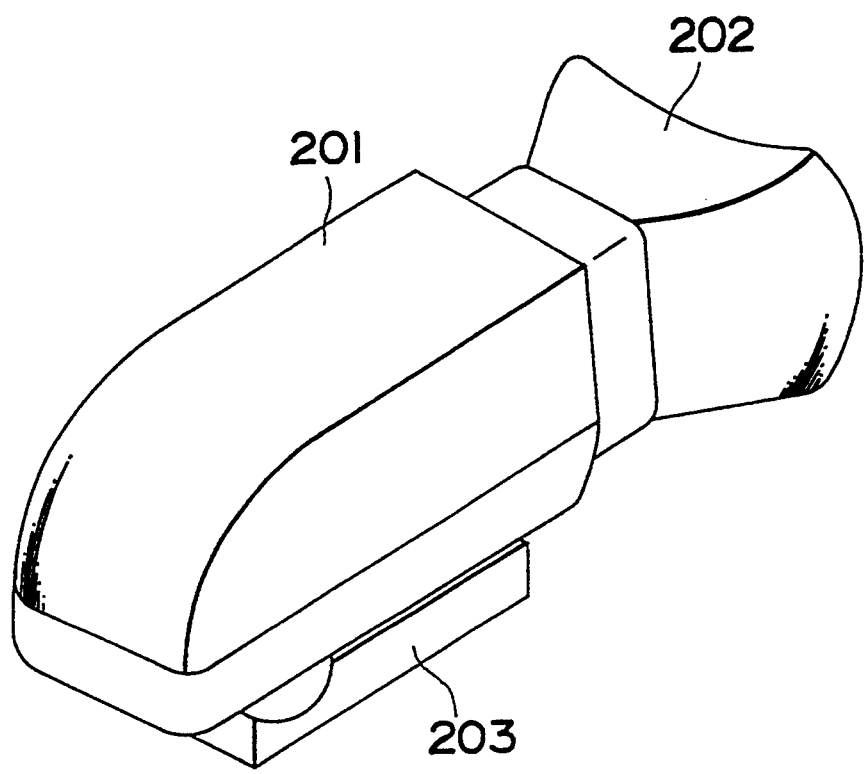
FIG. 20 is an external schematic view of a view finder employing a display device of the present invention.
Figure 21:
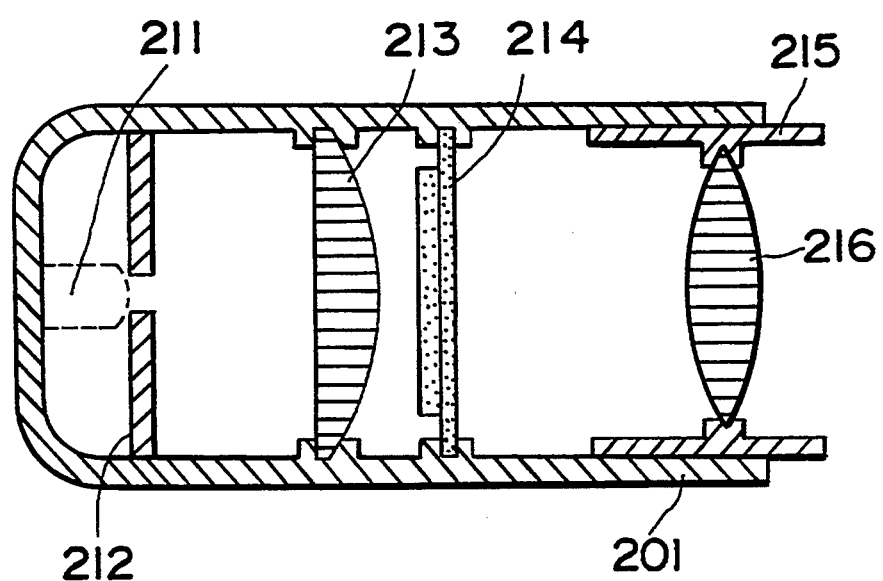
FIG. 21 is a sectional view of an essential part of the view finder shown in FIG. 20.

The following describes a view finder of the present invention with reference to FIGS. 20 and 21.

Referring to FIGS. 20 and 21, reference numeral 201 denotes a body of a view finder with a metal fitting 203, numeral 211 denotes a light emitting element, numeral 213 denotes a convergence lens, and numeral 214 denotes a display device of the present invention.

For instance, the display region of the display device 214 has a diagonal length of 28 mm, while the convergence lens 213 has an effective diameter of 30 mm and a focal point of 15 mm. The light emitting element 211 is arranged in the vicinity of the focal point of the convergence lens 213. The convergence lens 213 is a plano-convex lens with its plane surface faced to the light emitting element 211. An eyepiece ring 215 is provided at an end portion of the body 201. In the eyepiece ring 215 is mounted a magnifying lens 216. The body 201 has an internal surface with black or dark color to absorb unnecessary light components.

Reference numeral 212 denotes a light interruption plate having a circular through hole at its center portion. More concretely, the plate is a pinhole plate having a function of reducing the region from which light is emitted. When the area of the hole is increased, an enlarged display image on the display device results in, however, reduction in contrast. The above is because the quantity of light incident on the convergence lens 213 increases but the directivity of the incident light degrades. When the display region of the display device has a diagonal length of 28 mm as in the case described above, the region to emit light shall be about 15 mm$^2$ or smaller, which corresponds to a pinhole of about 4 mm in diameter. More preferably, the region shall be 10 mm$^2$ or smaller. However, when the pinhole diameter is made too small, the directivity of light is narrowed more than necessary to result in a significantly dark display image when a viewing point of the image on the view finder is moved only a little bit. Therefore, the area of the hole shall be at least 2 mm². For instance, a display image luminance equal or superior to that of the conventional view finder employing a surface light source can be obtained when the hole diameter is 3 mm. The hole diameter shall be in the range of 0.5 mm to 5 mm. It is noted that the above-mentioned arrangement is in the case where the diagonal length of the display screen is 28 mm. When increasing the diagonal length, the hole diameter is required to increase in proportional to the diagonal length. The display area and the area of the hole for emitting light must be in the ratio of not greater than 20:1, more preferably, the ratio shall be not greater than 40:1. However, in view of the angle of visibility, the ratio is preferably not smaller than 200:1.

Light emitted from the light emitting element 211 at a wide solid angle is converged into an approximate parallel light ray having a narrow directivity by the convergence lens 213 to be incident on the side of an opposite electrode (not shown) of the display device 214. The display device 214 forms an image by changing the degree of transmittance or diffusion of light of its liquid crystals according to a video signal applied to the display device 214. An observer of the image is to observe the display image on the display device 214 by putting his or her eyes close to the eyepiece ring 215 or the eyepiece cover 202. In other words, the eye position of the observer is almost fixed. Assuming now that all the pixels of the display device 214 allows the light to travel straight, the convergence lens 213 is so designed that the light emitted from the light emitting element 211 to be incident on the effective region of the convergence lens 213 is wholly incident on the eyes of the observer after passing through a magnifying lens 216. The observer can observe the small display image on the display device 214 magnified through the magnifying lens 216.

Since the eye position of the observer is almost fixed by the eyepiece cover 202 of the view finder, the light source arranged rearward is permitted to have a narrow directivity. In a conventional view finder using a fluorescent lamp light box as a light source, only a light ray travelling from a region having the same display region of the display device at a small solid angle in a specific direction is utilized and light rays travelling in the other directions are not utilized. In other words, there can be achieved a very low efficiency in utilizing light.

According to the present invention, a light source having a small light emitting body is used and light emitted from the light emitting body at a wide solid angle is converted into an approximate parallel light ray by means of the convergence lens 213. With the above-mentioned arrangement, the light going out of the convergence lens 213 has a narrow directivity. When the visual point of the observer is fixed, even the light having a narrow directivity can be sufficient for the view finder. When the light emitting body is small in size, of course the power consumption is small. As described above, the view finder of the present invention takes advantage of the fact that the observer observes the display image with his or her visual point fixed. Although a certain angle of visibility is necessary in a normal direct-vision LCD device, it is practically acceptable for the view finder that the display image thereof can be viewed well in a specified direction.

When the convergence lens 213 has no aberration and a transmittance of 100%, the luminance of the light emitting body viewed through the convergence lens is equal to the luminance of the light emitting body itself. Assuming that an LCD device including a color filter, polarizing plate, numerical aperture, and other factors has its maximum transmittance of 3%, the convergence lens 213 has a transmittance of 90%, and a luminance required for a view finder is 15 (ft-L), the necessary luminance of the light source is about 560 (ft-L) which is nearly equal to $15/(0.03 \times 0.9)$. As a light emitting body satisfying the above-mentioned conditions, there can be enumerated the self-light-emitting devices of: light emitting tubes utilizing the light emitting theories of cathode-ray tube, fluorescent lamp, or the like; electron-operating devices such as fluorescent light emitting element, tungsten lamp, LED, EL (Electro-Luminescence) lamp; and devices emitting light by electric discharge such as PDP (Plasma Display Panel). Any of the above-mentioned devices can be used as the light emitting means. Among others, the light emitting tube and LED are most appropriate.

A mosaic-shaped color filter (not shown) is attached to the display device 214. The pixels are arranged in a delta form, and the amount of the pixels is 55000. The color filter transmits any one of R, G and B light components. The film thickness of each color may be controlled according to the construction of the color filter. The color filter thickness is determined through adjustment in the production stage. In other words, the film thickness of the color filters are made different for R, G, and B light components. By controlling the film thickness of each color filter, the thickness of the liquid crystal film on each pixel can be adjusted according to each color filter. In particular, any display device employing polymer dispersion liquid crystals exhibits an inferior light diffusion characteristic with respect to light having a great wavelength (R color component). Therefore, an improved light diffusion characteristic can be achieved by making the liquid crystal layer thickness for the red pixels greater than those of the blue and green pixels to allow the gradations of red, green, and blue to be uniformed.

The convergence lens 213 is so arranged that its plane surface, i.e., the surface having a greater radius of curvature faces to the light emitting element 211. The above arrangement is adopted for the purpose of facilitating easy satisfaction of the sine condition to thereby assure a good uniformity in luminance of a display image on the display device 214. It is noted that the convergence lens 213 is not limited to the aforementioned plano-convex lens. The lens may be of course a normal convex lens.

By adjusting the degree of insertion of the eyepiece cover 215 into the body 201, a pint adjustment can be effected according to the eyesight of the observer. Since the eye position of the observer is fixed by the eyepiece cover 215, there is almost no possibility of displacing the visual point in the course of using the view finder. When the visual point is fixed, the observer can observe the display image well even when the directivity of the light toward the display device 214 is narrow. In order to observe the image better, it is only required to move the direction of light emitted from the light emitting element 211 into an appropriate direction. Therefore, it is preferred that the light emitting element 211 is provided with a position adjustment mechanism capable of slightly moving the element depthwise or laterally.

When using a light emitting tube in a miniature lamp style, it is advisable to use a white light emitting type miniature lamp of Lunalight series (having a diameter of 7 mm or 10 mm) provided by Minipilo Electric Co., Ltd. When using a rod-shaped cold-cathode fluorescent lamp, a lamp of Model No. 5-C21T26E85H manufactured by Matsushita Electric Industrial Co., Ltd. is availed. The above-mentioned light emitting tube or the cold-cathode fluorescent lamp is used in a construction such that light is emitted from a very small region to be used as the light emitting element 211 of the view finder of the present invention.

EXAMPLE 5

Figure 22:
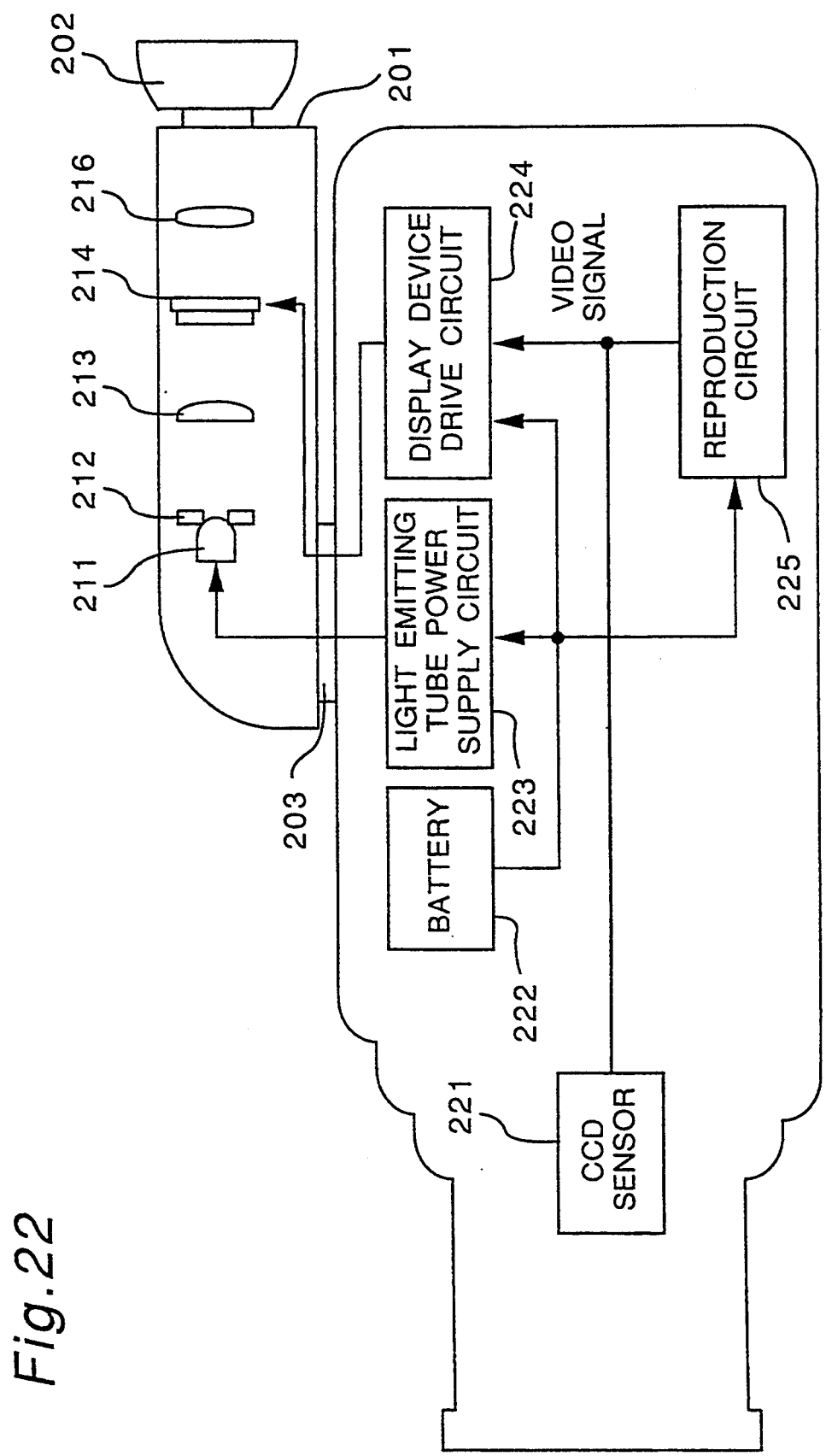
FIG. 22 is a schematic view of a video camera to which a view finder of the present invention is attached.
Figure 23:
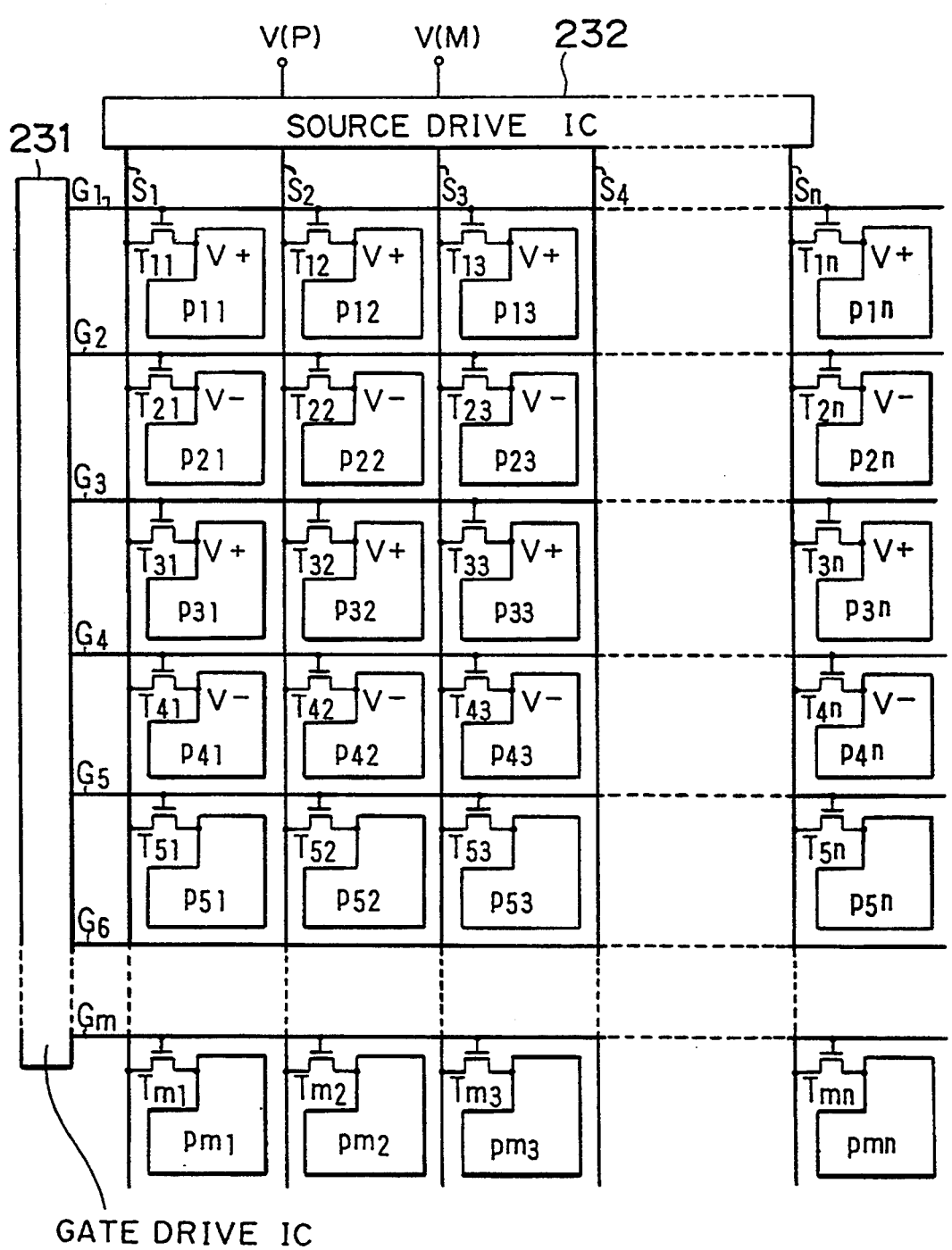
FIG. 23 is a schematic circuit view of a conventional display device.

The following describes a condition where a view finder of the present invention shown in FIGS. 20 and 21 is mounted to a video camera with reference to FIG. 22.

Referring to FIG. 22, the body 201 of the view finder is mounted to the body of the video camera by means of a metal fitting 203. With regard to the display device 214 of the present invention, the display screen has a diagonal length of 28 mm (1.1 inch). Reference numeral 224 denotes a drive circuit as shown mainly in FIG. 4. A light emitting tube (Lunalight-07 series) manufactured by Minipilo Electric Co., Ltd. is used as the light emitting element 211. The light emitting tube has a diameter of 7 mm. The tube is a three-wavelength color light emission type to provide white light. To the light emitting tube is applied a voltage from a light emitting tube power supply circuit 223. The light emitting tube power supply circuit 223 supplies a heater voltage of 2.5 V and an anode voltage of 18 V to the light emitting tube 211. Both the voltages are DC voltages. The light emitting tube power supply circuit has a circuit for modulating the anode voltage with a pulse signal. The pulse signal cycle is 60 Hz. By using the pulse signal as the voltage applied to the anode, the quantity of light emitted from the light emitting tube 211 can be varied in proportion to the pulse width. The pulse width can be continuously varied from 0 (0%) to 1/1 (100%) by rotating a variable resistor provided at the video camera.

In an embodiment, the luminance of the light emitting tube is about 800 (ft-L) when the pulse width is ½ (50%). In the condition of 1/1, i.e., when the anode voltage is continuously applied, a doubled luminance of 1600 (ft-L) is achieved. When the luminance of the light emitting tube is about 800 (ft-L), the power consumption of the light source section is about 0.25 W. Meanwhile, a video signal is output from a CCD sensor 221 and applied to a video amplifier 41 (see FIG. 3) of a display device drive circuit 224 to display an image on the display device 214. A video signal recorded in a video tape is reproduced by a reproduction circuit 225 to be applied to the video amplifier 41. Reference numeral 222 denotes a battery attached to the video camera to supply an electric power to the light emitting tube power supply circuit 223, the display device drive circuit 224, and the reproduction circuit 225. In contrast to the fact that the conventional view finder employing a TN LCD panel has consumed a power slightly greater than 1.0 W, the view finder of the present invention consumes a power slightly greater than 0.3 W, meaning that the power consumption is reduced to one third.

The view finder of the present invention can include a variety of modifications thereof. For instance, there can be enumerated a type employing a Fresnel's lens as the convergence lens 213, a type employing two magnifying lenses 216, and a type employing a diffraction grating between the display device 214 and the magnifying lens 216.

Furthermore, each display device of the present invention is characterized in that a high voltage can be applied to each pixel by means of a source drive IC for forming an output in positive polarity and a source drive IC for forming an output in negative polarity. There is no limitation in applications of each display device of the present invention to use each display device for a liquid crystal panel as described in conjunction with each embodiment. For instance, the display device can be of course applied to an EL (Electro Luminescence) panel or a PDP (Plasma Display Panel).

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A display device comprising:
   a first drive means for outputting a signal of a positive polarity with respect to a specified electrical potential;
   a second drive means for outputting a signal of a negative polarity with respect to the specified electrical potential;
   a substrate on which pixel electrodes are arranged in a matrix, each pixel electrode having one switching element;
   a first changeover means which is operatively connected between a signal output terminal of said first drive means and said switching element to set in any one of low- and high-impedance conditions between the input terminal and the output terminal of said switching element;
   a second changeover means which is operatively connected between a signal output terminal of said second drive means and said switching element to set in any one of low- and high-impedance conditions between the input terminal and the output terminal of said switching element; and
   a control means for controlling the impedance conditions between the signal input terminals and signal output terminals of said first and second changeover means so that the output signal of the first drive means and the output signal of the second drive means are not simultaneously applied to said switching element.

2. A display device comprising:
   first drive means for outputting a signal of positive polarity with respect to a specified electric potential; second drive means for outputting signal of negative polarity with respect to the specified electric potential; a substrate on which pixel electrodes are arranged in matrix; and selecting means for selecting any one of the output signals of the first and second drive means to be input to the pixel electrodes;
   a first changeover means composed of analog switch elements which are electrically connected to the first drive means;
   a second changeover means composed of analog switch elements which are electrically connected to the second drive means, wherein the first drive means is electrically connected to the second drive means by way of the first and second changeover means via source signal lines;

a control means for on-off controlling the analog switch elements in the changeover means to be turned on and off according to the logic level at the input terminals of the first and second changeover means in such a manner that, when each switch element in the first changeover means is in a low-impedance condition, each switch element in the second changeover means is in a high-impedance condition, and when each switch element in the first changeover means is in a high-impedance condition, each switch element in the second changeover means is in a low-impedance condition, whereby the output signal of the first drive means and the output signal of the second drive means are not simultaneously applied to the source signal lines so that only one of the first and second drive means is electrically connected to the source signal lines.

3. A display device comprising:

an active matrix type liquid crystal display panel having liquid crystals interposed between a first substrate on which an opposite electrode is formed and a second substrate on which pixel electrodes arranged in matrix and a transistor element for inputting a signal into each of the pixel electrodes are formed;

a first drive means for outputting a signal of a positive polarity with respect to an electrical potential at the opposite electrode;

a second drive means for outputting a signal of a negative polarity with respect to the electrical potential at the opposite electrode; and at least first and second transistor elements formed on each of the pixel electrodes, wherein:

a first terminal of the first transistor element is connected to a first signal line, and one terminal of the first signal line is electrically connected to a signal output terminal of the first drive means;

a first terminal of the second transistor element is connected to a second signal line, and one terminal of the second signal line is electrically connected to a signal output terminal of the second drive means;

second terminals of the first and second transistor elements are connected to different gate signal lines, and third terminals of the first and second transistor elements are connected to an identical pixel electrode.

4. A display device as claimed in claim 3, wherein a second signal line connected to a transistor element for inputting a signal into a pixel electrode $P_{ij}$ which is different from a second signal line connected to a transistor element for inputting a signal into a pixel electrode $P_{ij+1}$, wherein i is an integer belonging to a row of the matrix and j is an integer belonging to a column of the matrix, and a first signal line connected to a transistor element for inputting a signal into the pixel electrode $P_{ij}$ which is different from a first signal line connected to a transistor element for inputting a signal into the pixel electrode $P_{i+1j}$.

5. A display device as claimed in claim 3, wherein first and second signal lines connected to a transistor element for inputting a signal into a pixel electrode $P_{ij}$ which is different respectively from first and second signal lines connected to a transistor element for inputting a signal into a pixel electrode $P_{ij+1}$ wherein i is an integer belonging to a row of the matrix and j is an integer belonging to a column of the matrix, and at least one TFT selected from among a plurality of transistor elements for inputting a signal into the pixel electrode $P_{ij}$ and at least one TFT selected from among a plurality of transistor elements for inputting a signal into the pixel electrode $P_{ij+1}$ are connected to an identical second signal line.

6. A display device as claimed in claim 3, wherein a first terminal of a first transistor element for inputting a signal into a pixel electrode $P_{ij}$ and a first terminal of a first transistor element for inputting a signal into a pixel electrode $P_{ij+1}$ are electrically connected to a first signal line, wherein i is an integer belonging to a row of the matrix and j is an integer belonging to a column of the matrix, and a first terminal of a second transistor element for inputting a signal into the pixel electrode $P_{ij}$ and a first terminal of a second transistor element for inputting a signal into the pixel electrode $P_{ij-1}$ are electrically connected to a second signal line.

7. A display device as claimed in claim 3, wherein the liquid crystals are polymer dispersion liquid crystals.

8. A display device as claimed in claim 3, wherein:

the opposite electrode is comprised of a transparent conductive thin film and a first thin film in contact with the transparent conductive thin film;

the transparent conductive thin film has an optical film thickness of approximately $\lambda/2$, wherein $\lambda$ is a peak wavelength of a light ray incident on the liquid crystals;

the first thin film has an optical film thickness of approximately $\lambda/4$, and a relationship of $n_1 > n_2$ holds assuming that the refractive index of the transparent conductive thin film is $n_1$ and the refractive index of the first thin film is $n_2$.

9. A display device as claimed in claim 8, wherein the first thin film is made of any one of aluminum oxide, yttrium oxide, silicon monoxide, magnesium oxide, tungsten oxide, cerium fluoride, and lead fluoride.

10. A display device as claimed in claim 7, wherein the polymer dispersion liquid crystals have a water-drop-shaped liquid crystal average particle diameter or a polymer network average pore diameter of 0.8 μm to 3.0 μm.

11. A display device as claimed in claim 7, wherein the polymer dispersion liquid crystals are in the form of a film having a film thickness of not smaller than 5 μm.

12. A display device comprising:

an active matrix type liquid crystal display panel having liquid crystals interposed between a first substrate on which an opposite electrode is formed and a second substrate on which pixel electrodes arranged in matrix and a transistor element for inputting a signal into each of the pixel electrodes are formed;

a first drive means for outputting a signal of a positive polarity with respect to an electrical potential at the opposite electrode;

a second drive means for outputting a signal of a negative polarity with respect to the electrical potential at the opposite electrode;

a first changeover means for changing a condition between a first signal input terminal and a second signal output terminal of the first drive means between a low-impedance condition and a high-impedance as arranged on the side of the second signal output terminal of the first drive means; and a second changeover means for changing a condition between a second signal input terminal and a third signal output terminal of the second drive means between a low-impedance condition and a high-impedance as arranged on the side of the third signal output terminal of the second drive means; wherein:

the second signal output terminal of the first drive means and a first signal input terminal of the first changeover means are electrically connected to each other;

the third signal output terminal of the second drive means and a second signal input terminal of the second changeover means are electrically connected to each other;

a second signal output terminal of the first changeover means and a fourth signal output terminal of the second changeover means are electrically connected to each other by means of a signal line;

a control for avoiding concurrence of the low-impedance condition between the first signal input terminal and the second signal output terminal of the first changeover means with the low-impedance condition between the second signal input terminal and the fourth signal output terminal of the second changeover means is effected; and one terminal of the transistor element is electrically connected to the signal line.

13. A display device as claimed in claim 12, wherein the liquid crystals are polymer dispersion liquid crystals.

14. A display device as claimed in claim 12, wherein:
the opposite electrode is comprised of a transparent conductive thin film and a first thin film in contact with the transparent conductive thin film;
the transparent conductive thin film has an optical film thickness of approximately $\lambda/2$, wherein $\lambda$ is a peak wavelength of a light ray incident on the liquid crystals;
the first thin film has an optical film thickness of approximately $\lambda/4$, and
a relationship of $n_1 > n_2$ holds assuming that the refractive index of the transparent conductive thin film is $n_1$ and the refractive index of the first thin film is $n_2$.

15. A display device as claimed in claim 14, wherein the first thin film is made of any one of aluminum oxide, yttrium oxide, silicon monoxide, magnesium oxide, tungsten oxide, cerium fluoride, and lead fluoride.

16. A display device as claimed in claim 13, wherein the polymer dispersion liquid crystals have a waterdrop-shaped liquid crystal average particle diameter or a polymer network average pore diameter of 0.8 $\mu$m to 3.0 $\mu$m.

17. A display device as claimed in claim 15, wherein the polymer dispersion liquid crystals are in the form of a film having a film thickness which is not smaller than 5 $\mu$m.

18. A display system comprising:
a light emitting element;
a light ray converging means for converging a light ray emitted from the light emitting element into an approximately parallel light ray;
a display device comprising: an active matrix type liquid crystal display panel having liquid crystals interposed between a first substrate on which an opposite electrode is formed and a second substrate on which pixel electrodes arranged in matrix and a transistor element for inputting a signal into each of the pixel electrodes are formed; a first drive means for outputting a signal of a positive polarity with respect to an electrical potential at the opposite electrode; a second drive means for outputting a signal of a negative polarity with respect to the electrical potential at the opposite electrode; and at least first and second transistor elements formed on each of the pixel electrodes, wherein: a first terminal of the first transistor element is connected to a first signal line, and one terminal of the first signal line is electrically connected to a signal output terminal of the first drive means; a first terminal of the second transistor element is connected to a second signal line, and one terminal of the second signal line is electrically connected to a signal output terminal of the second drive means; second terminals of the first and second transistor elements are connected to different gate signal lines, and third terminals of the first and second transistor elements are connected to an identical pixel electrode for modulating the light ray output from the light ray converging means; and a magnification display means for magnifying a display image on the display device, wherein:
a light ray, which is emitted from the light emitting element and which is incident on an effective region of the light converging means so as to travel straight through the display device, reaches an eye of an observer of the image.

19. A display system as claimed in claim 18, wherein the convergence lens is a plano-convex lens arranged so that the plane surface thereof faces the light emitting element.

20. A display system as claimed in claim 18, wherein an eyepiece cover capable of approximately fixing the visual point of the observer is interposed between the magnification display means and the observer.

21. A display system comprising:
a light emitting element;
light ray converging means for converting a light ray emitted from the light emitting element into an approximate parallel light ray;
a display device comprising: an active matrix type liquid crystal display panel having liquid crystals interposed between a first substrate on which an opposite electrode is formed and a second substrate on which pixel electrodes arranged in matrix and a transistor element for inputting a signal into each of the pixel electrodes are formed; a first drive means for outputting a signal of a positive polarity with respect to an electrical potential at the opposite electrode; a second drive means for outputting a signal of a negative polarity with respect to the electrical potential at the opposite electrode; a first changeover means for changing a condition between a first signal input terminal and a second signal output terminal of the first drive means between a low-impedance condition and a high-impedance as arranged on the side of the second signal output terminal of the first drive means; and a second changeover means for changing a condition between a second signal input terminal and a third signal output terminal of the second drive means between a low-impedance condition and a high-impedance as arranged on the side of the third signal output terminal of the second drive means; wherein: the second signal output terminal of the first drive means and a first signal input terminal of the first changeover means are electrically connected to each other; the third signal output terminal of the second drive means and a second signal input terminal of the second changeover means are electrically connected to each other; a second signal output terminal of the first changeover means and a fourth signal output terminal of the second changeover means are electrically connected to each other by means of a signal line; a control for avoiding concurrence of the low-impedance condition between the first signal input terminal and the second signal output terminal of the first changeover means with the low-impedance condition between the second signal input terminal and the fourth signal output terminal of the second changeover means is effected; and one terminal of the transistor element is electrically connected to the signal line, for modulating the light ray output from the light ray converging means; and a magnification display means for magnifying a display image on the display device, wherein:

a light ray, which is emitted from the light emitting element and which is incident on an effective region of the light converging means so as to travel straight through the display device, reaches an eye of an observer of the image.

22. A display system as claimed in claim 21, wherein the convergence lens is a plano-convex lens arranged so that the plane surface thereof faces the light emitting element.

23. A display system as claimed in claim 21, wherein an eyepiece cover capable of approximately fixing the visual point of the observer is interposed between the magnification display means and the observer.

24. A display system comprising:

a light source;

a color separation optical system for separating light emitted from the light source into a plurality of light components; a display device comprising: an active matrix type liquid crystal display panel having liquid crystals interposed between a first substrate on which an opposite electrode is formed and a second substrate on which pixel electrodes arranged in matrix and a transistor element for inputting a signal into each of the pixel electrodes are formed; a first drive means for outputting a signal of a positive polarity with respect to an electrical potential at the opposite electrode; a second drive means for outputting a signal of a negative polarity with respect to the electrical potential at the opposite electrode; and at least first and second transistor elements formed on each of the pixel electrodes, wherein: a first terminal of the first transistor element is connected to a first signal line, and one terminal of the first signal line is electrically connected to a signal output terminal of the first drive means; a first terminal of the second transistor element is connected to a second signal line, and one terminal of the second signal line is electrically connected to a signal output terminal of the second drive means; second terminals of the first and second transistor elements are connected to different gate signal lines, and third terminals of the first and second transistor elements are connected to an identical pixel electrode; provided for each of the light components separated by the color separation optical system; and a projection lens for magnifyingly projecting light modulated by the display device.

25. A display system as claimed in claim 24, wherein a color synthesis optical system for synthesizing a plurality of light components in an identical light path is provided at a place on the optical output side of the display device.

26. A display system comprising:

a light source;

a display device comprising: an active matrix type liquid crystal display panel having liquid crystals interposed between a first substrate on which an opposite electrode is formed and a second substrate on which pixel electrodes arranged in matrix and a transistor element for inputting a signal into each of the pixel electrodes are formed; a first drive means for outputting a signal of a positive polarity with respect to an electrical potential at the opposite electrode; a second drive means for outputting a signal of a negative polarity with respect to the electrical potential at the opposite electrode; and at least first and second transistor elements formed on each of the pixel electrodes, wherein: a first terminal of the first transistor element is connected to a first signal line, and one terminal of the first signal line is electrically connected to a signal output terminal of the first drive means; a first terminal of the second transistor element is connected to a second signal line, and one terminal of the second signal line is electrically connected to a signal output terminal of the second drive means; second terminals of the first and second transistor elements are connected to different gate signal lines, and third terminals of the first and second transistor elements are connected to an identical pixel electrode;

a color separation and color synthesis optical system for separating light emitted from the light source into a plurality of light components and for synthesizing light modulated by the display device in an identical light path;

a projection lens for magnifyingly projecting the light ray synthesized in the identical light path; and a mirror provided inside the projection lens, wherein the light emitted from the light source is covered on the mirror to be conducted to the display device.

27. A display system comprising:

a light source;

a color separation optical system for separating light emitted from the light source into a plurality of light components;

a display device comprising: an active matrix type liquid crystal display panel having liquid crystals interposed between a first substrate on which an opposite electrode is formed and a second substrate on which pixel electrodes arranged in matrix and a transistor element for inputting a signal into each of the pixel electrodes are formed; a first drive means for outputting a signal of a positive polarity with respect to an electrical potential at the opposite electrode; a second drive means for outputting a signal of a negative polarity with respect to the electrical potential at the opposite electrode; a first changeover means for changing a condition between a first signal input terminal and a second signal output terminal of the first drive means between a low-impedance condition and a high-impedance as arranged on the side of the second signal output terminal of the first drive means; and a second changeover means for changing a condition between a second signal input terminal and a third signal output terminal of the second drive means between a low-impedance condition and a high-impedance as arranged on the side of the third signal output terminal of the second drive means; wherein: the second signal output terminal of the first drive means and a first signal input terminal of the first changeover means are electrically connected to each other; the third signal output terminal of the second drive means and a second signal input terminal of the second changeover means are electrically connected to each other; a second signal output terminal of the first changeover means and a fourth signal output terminal of the second changeover means are electrically connected to each other by means of a signal line; a control for avoiding concurrence of the low-impedance condition between the first signal input terminal and the second signal output terminal of the first changeover means with the low-impedance condition between the second signal input terminal and the fourth signal output terminal of the second changeover means is effected; and one terminal of the transistor element is electrically connected to the signal line wherein: the opposite electrode is comprised of a transparent conductive thin film and a first thin film in contact with the transparent conductive thin film; the transparent conductive thin film has an optical film thickness of approximately $\lambda/2$, wherein $\lambda$ is a peak wavelength of a light ray incident on the liquid crystals; the first thin film has an optical film thickness of approximately $\lambda/4$, and a relationship of $n_1 > n_2$ holds assuming that the refractive index of the first thin film is $n_2$, provided for each of the light components separated by the color separation optical system; and a projection lens for magnifyingly projecting light modulated by the display device.

28. A display system as claimed in claim 27, wherein a color synthesis optical system for synthesizing a plurality of light components in an identical light path is provided at a place on the optical output side of the display device.

29. A display system comprising:

a light source;

a display device comprising: an active matrix type liquid crystal display panel having liquid crystals interposed between a first substrate on which an opposite electrode is formed and a second substrate on which pixel electrodes arranged in matrix and a transistor element for inputting a signal into each of the pixel electrodes are formed; a first drive means for outputting a signal of a positive polarity with respect to an electrical potential at the opposite electrode; a second drive means for outputting a signal of a negative polarity with respect to the electrical potential at the opposite electrode; a first changeover means for changing a condition between a first signal input terminal and a second signal output terminal of the first drive means between a low-impedance condition and a high-impedance as arranged on the side of the second signal output terminal of the first drive means; and a second changeover means for changing a condition between a second signal input terminal and a third signal output terminal of the second drive means between a low-impedance condition and a high-impedance as arranged on the side of the third signal output terminal of the second drive means; wherein: the second signal output terminal of the first drive means and a first signal input terminal of the first changeover means are electrically connected to each other; the third signal output terminal of the second drive means and second signal input terminal of the second changeover means are electrically connected to each other; a second signal output terminal of the first changeover means and a fourth signal output terminal of the second changeover means are electrically connected to each other by means of a signal line; a control for avoiding concurrence of the low-impedance condition between the first signal input terminal and the second signal output terminal of the first changeover means with the low-impedance condition between the second signal input terminal and the fourth signal output terminal of the second changeover means is effected; and one terminal of the transistor element is electrically connected to the signal line wherein: the opposite electrode is comprised of a transparent conductive thin film and a first thin film in contact with the transparent conductive thin film; the transparent conductive thin film has an optical film thickness of approximately $\lambda/2$, wherein $\lambda$ is a peak wavelength of a light ray incident on the liquid crystals; the first thin film has an optical film thickness of approximately $\lambda/4$, and a relationship of $n_1 > n_2$ holds assuming that the refractive index of the transparent conductive thin film is $n_1$ and the refractive index of the first thin film is $n_2$, a color separation and color synthesis optical system for separating light emitted from the light source into a plurality of light components and for synthesizing light modulated by the display device in an identical light path;

a projection lens for magnifyingly projecting the light ray synthesized in the identical light path; and a mirror provided inside the projection lens, wherein the light emitted from the light source is converged on the mirror to be conducted to the display device.

* * * * *